(12) United States Patent
Guha et al.

(10) Patent No.: US 12,706,463 B2
(45) Date of Patent: Aug. 11, 2026

(54) MICROGRID CONTROLLER AND METHODS FOR CONTROLLING A MICROGRID

(71) Applicant: Honeywell International Inc., Charlotte, NC (US)

(72) Inventors: Rituparna Guha, Bangalore (IN); Umai Selvi Thangaraj, Tamil Nadu (IN); Vivek Varma Bharath, Marietta, GA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/916,365

(22) Filed: Oct. 15, 2024

(65) Prior Publication Data

US 2025/0125628 A1 Apr. 17, 2025

(30) Foreign Application Priority Data

Oct. 16, 2023 (IN) ............................. 202311070137

(51) Int. Cl.

*H02J 3/388* (2026.01)
*H02J 3/0012* (2026.01)
*H02J 3/38* (2026.01)
*H02J 101/10* (2026.01)
*H02J 101/24* (2026.01)

(Continued)

(52) U.S. Cl.

CPC ............ *H02J 3/388* (2020.01); *H02J 3/0012* (2020.01); *H02J 3/381* (2013.01); *H02J 2101/10* (2026.01); *H02J 2101/24* (2026.01); *H02J 2101/28* (2026.01); *H02J 2103/30* (2026.01); *H02J 2103/35* (2026.01)

(58) Field of Classification Search

CPC .......... H02J 3/0012; H02J 3/381; H02J 3/388; H02J 2300/10; H02J 2300/24; H02J 2300/28; H02J 2203/10; H02J 2203/20; H02J 9/00; Y10T 307/62

USPC ............................................................ 307/65

See application file for complete search history.

(56) References Cited

U.S. PATENT DOCUMENTS

| | | | |
|---|---|---|---|
| 11,501,389 | B2 | 11/2022 | Forbes, Jr. et al. |
| 2023/0120740 | A1 | 4/2023 | Lewchuk et al. |

OTHER PUBLICATIONS

Bhattarai, B. P., "Big data analytics in smart grids: state-of-theart, challenges, opportunities, and future directions", IET Smart Grid, vol. 2, No. 2, 2019, pp. 141-154.

(Continued)

*Primary Examiner* — Hal Kaplan

(74) *Attorney, Agent, or Firm* — Seager, Tufte & Wickhem, LLP

(57) ABSTRACT

A microgrid has a microgrid controller that controls power delivery from two or more energy sources to one or more microgrid loads. A prediction is made as to when a main power grid may lose power. The microgrid controller operates in a prepare for islanding mode when a future loss of power is predicted, during which power received from the main power grid source, a solar power source and/or a wind power source are prioritized over energy costs and $CO_2$ emissions to charge the battery power source to a prepare for islanding charge level. The microgrid controller operates in an islanding mode when the main power grid source loses power, during which power received from the solar power source, the wind power source, the battery power source and/or a diesel generator power source are prioritized to maximize a time that the microgrid can remain powered.

20 Claims, 18 Drawing Sheets

(51) Int. Cl.

| | |
|---|---|
| ***H02J 101/28*** | (2026.01) |
| ***H02J 103/30*** | (2026.01) |
| ***H02J 103/35*** | (2026.01) |

(56) References Cited

OTHER PUBLICATIONS

Ovation (Trademark) Compact Controller, "Scalable Controller Designed for Standalone Power, Renewable or Microgrid Applications", 2017-2018, 2 pages.
Vaishanavi, P., et al. "The Internet of Renewable Energy: Big Data-Driven Smart Grid Management with the Reliability and Security Analysis.," in Reliability and Risk Assessment in Engineering Chapter 2, Gupta, V.J., et al., eds, Proceedings of INCRS 2018, 2018, 523 pages.
Wikipedia, "Microgrid", available online at: <https://en.wikipedia.org/wiki/Microgrid>, retrieved on Sep. 26, 2023, 15 pages.

CITY SUITE OPERATOR APPLICATION
30

CITY SUITE PLATFORM
28

SCADA SYSTEM
26

MICROGRID CONTROLLER
22
MICROGRID CONTROLLER
22
16
ECS
ECS
RTU RTU RTU RTU
RTU RTU RTU RTU
24
24

Figure 5A:
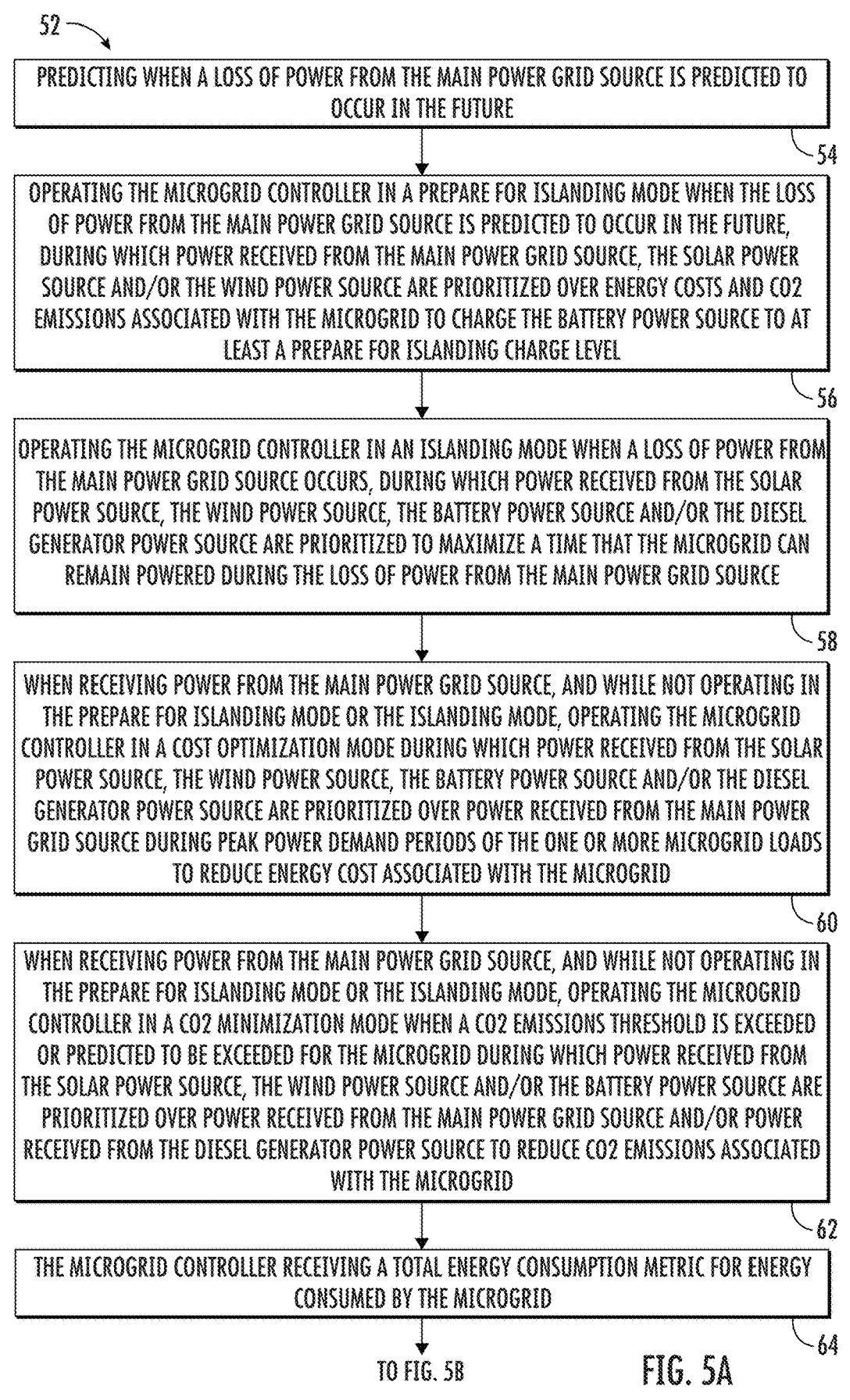

52

PREDICTING WHEN A LOSS OF POWER FROM THE MAIN POWER GRID SOURCE IS PREDICTED TO OCCUR IN THE FUTURE

54

OPERATING THE MICROGRID CONTROLLER IN A PREPARE FOR ISLANDING MODE WHEN THE LOSS OF POWER FROM THE MAIN POWER GRID SOURCE IS PREDICTED TO OCCUR IN THE FUTURE, DURING WHICH POWER RECEIVED FROM THE MAIN POWER GRID SOURCE, THE SOLAR POWER SOURCE AND/OR THE WIND POWER SOURCE ARE PRIORITIZED OVER ENERGY COSTS AND CO2 EMISSIONS ASSOCIATED WITH THE MICROGRID TO CHARGE THE BATTERY POWER SOURCE TO AT LEAST A PREPARE FOR ISLANDING CHARGE LEVEL

56

OPERATING THE MICROGRID CONTROLLER IN AN ISLANDING MODE WHEN A LOSS OF POWER FROM THE MAIN POWER GRID SOURCE OCCURS, DURING WHICH POWER RECEIVED FROM THE SOLAR POWER SOURCE, THE WIND POWER SOURCE, THE BATTERY POWER SOURCE AND/OR THE DIESEL GENERATOR POWER SOURCE ARE PRIORITIZED TO MAXIMIZE A TIME THAT THE MICROGRID CAN REMAIN POWERED DURING THE LOSS OF POWER FROM THE MAIN POWER GRID SOURCE

58

WHEN RECEIVING POWER FROM THE MAIN POWER GRID SOURCE, AND WHILE NOT OPERATING IN THE PREPARE FOR ISLANDING MODE OR THE ISLANDING MODE, OPERATING THE MICROGRID CONTROLLER IN A COST OPTIMIZATION MODE DURING WHICH POWER RECEIVED FROM THE SOLAR POWER SOURCE, THE WIND POWER SOURCE, THE BATTERY POWER SOURCE AND/OR THE DIESEL GENERATOR POWER SOURCE ARE PRIORITIZED OVER POWER RECEIVED FROM THE MAIN POWER GRID SOURCE DURING PEAK POWER DEMAND PERIODS OF THE ONE OR MORE MICROGRID LOADS TO REDUCE ENERGY COST ASSOCIATED WITH THE MICROGRID

60

WHEN RECEIVING POWER FROM THE MAIN POWER GRID SOURCE, AND WHILE NOT OPERATING IN THE PREPARE FOR ISLANDING MODE OR THE ISLANDING MODE, OPERATING THE MICROGRID CONTROLLER IN A CO2 MINIMIZATION MODE WHEN A CO2 EMISSIONS THRESHOLD IS EXCEEDED OR PREDICTED TO BE EXCEEDED FOR THE MICROGRID DURING WHICH POWER RECEIVED FROM THE SOLAR POWER SOURCE, THE WIND POWER SOURCE AND/OR THE BATTERY POWER SOURCE ARE PRIORITIZED OVER POWER RECEIVED FROM THE MAIN POWER GRID SOURCE AND/OR POWER RECEIVED FROM THE DIESEL GENERATOR POWER SOURCE TO REDUCE CO2 EMISSIONS ASSOCIATED WITH THE MICROGRID

62

THE MICROGRID CONTROLLER RECEIVING A TOTAL ENERGY CONSUMPTION METRIC FOR ENERGY CONSUMED BY THE MICROGRID

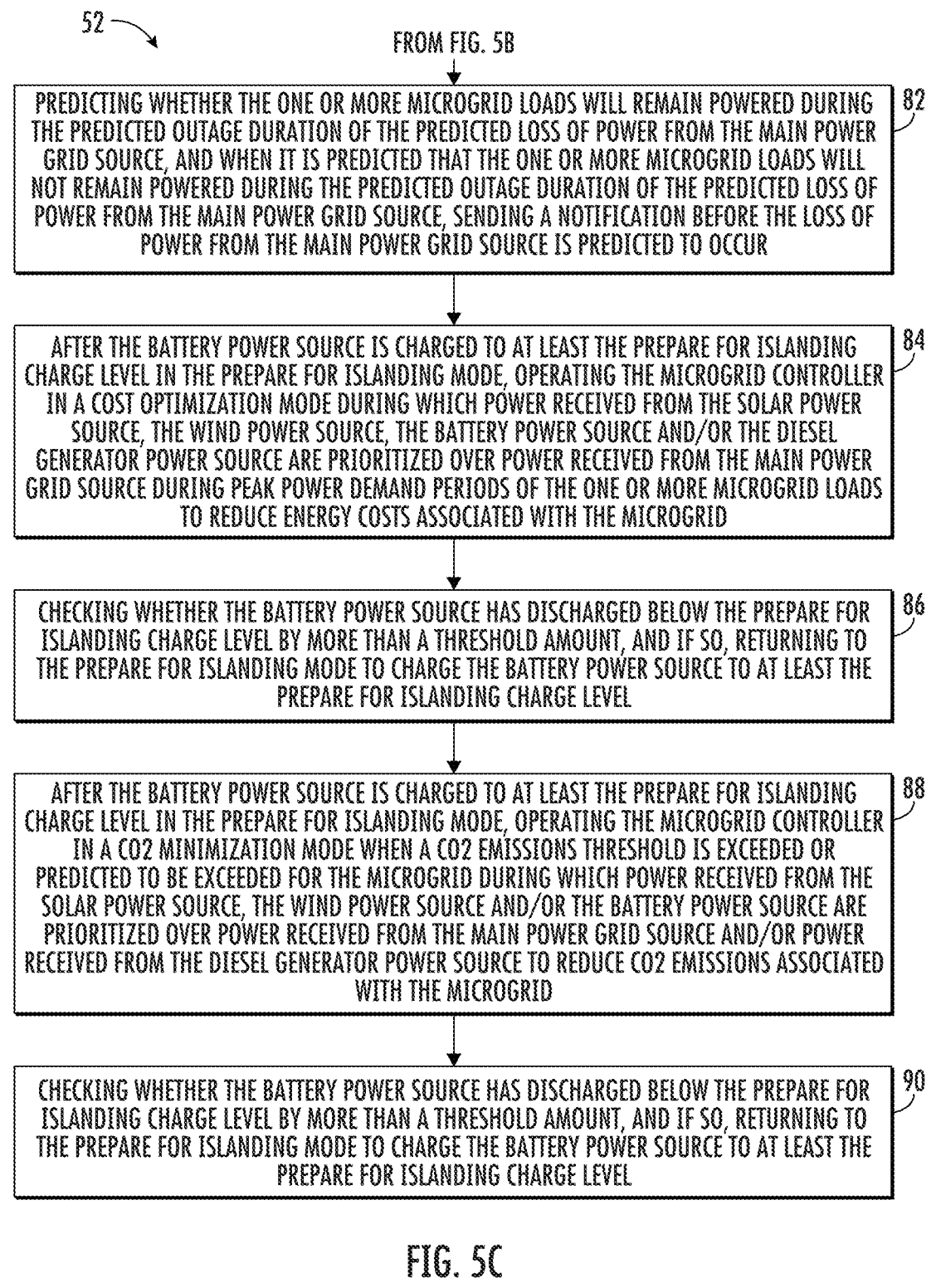

FROM FIG. 5B

PREDICTING WHETHER THE ONE OR MORE MICROGRID LOADS WILL REMAIN POWERED DURING THE PREDICTED OUTAGE DURATION OF THE PREDICTED LOSS OF POWER FROM THE MAIN POWER GRID SOURCE, AND WHEN IT IS PREDICTED THAT THE ONE OR MORE MICROGRID LOADS WILL NOT REMAIN POWERED DURING THE PREDICTED OUTAGE DURATION OF THE PREDICTED LOSS OF POWER FROM THE MAIN POWER GRID SOURCE, SENDING A NOTIFICATION BEFORE THE LOSS OF POWER FROM THE MAIN POWER GRID SOURCE IS PREDICTED TO OCCUR (82)

AFTER THE BATTERY POWER SOURCE IS CHARGED TO AT LEAST THE PREPARE FOR ISLANDING CHARGE LEVEL IN THE PREPARE FOR ISLANDING MODE, OPERATING THE MICROGRID CONTROLLER IN A COST OPTIMIZATION MODE DURING WHICH POWER RECEIVED FROM THE SOLAR POWER SOURCE, THE WIND POWER SOURCE, THE BATTERY POWER SOURCE AND/OR THE DIESEL GENERATOR POWER SOURCE ARE PRIORITIZED OVER POWER RECEIVED FROM THE MAIN POWER GRID SOURCE DURING PEAK POWER DEMAND PERIODS OF THE ONE OR MORE MICROGRID LOADS TO REDUCE ENERGY COSTS ASSOCIATED WITH THE MICROGRID (84)

CHECKING WHETHER THE BATTERY POWER SOURCE HAS DISCHARGED BELOW THE PREPARE FOR ISLANDING CHARGE LEVEL BY MORE THAN A THRESHOLD AMOUNT, AND IF SO, RETURNING TO THE PREPARE FOR ISLANDING MODE TO CHARGE THE BATTERY POWER SOURCE TO AT LEAST THE PREPARE FOR ISLANDING CHARGE LEVEL (86)

AFTER THE BATTERY POWER SOURCE IS CHARGED TO AT LEAST THE PREPARE FOR ISLANDING CHARGE LEVEL IN THE PREPARE FOR ISLANDING MODE, OPERATING THE MICROGRID CONTROLLER IN A CO2 MINIMIZATION MODE WHEN A CO2 EMISSIONS THRESHOLD IS EXCEEDED OR PREDICTED TO BE EXCEEDED FOR THE MICROGRID DURING WHICH POWER RECEIVED FROM THE SOLAR POWER SOURCE, THE WIND POWER SOURCE AND/OR THE BATTERY POWER SOURCE ARE PRIORITIZED OVER POWER RECEIVED FROM THE MAIN POWER GRID SOURCE AND/OR POWER RECEIVED FROM THE DIESEL GENERATOR POWER SOURCE TO REDUCE CO2 EMISSIONS ASSOCIATED WITH THE MICROGRID (88)

CHECKING WHETHER THE BATTERY POWER SOURCE HAS DISCHARGED BELOW THE PREPARE FOR ISLANDING CHARGE LEVEL BY MORE THAN A THRESHOLD AMOUNT, AND IF SO, RETURNING TO THE PREPARE FOR ISLANDING MODE TO CHARGE THE BATTERY POWER SOURCE TO AT LEAST THE PREPARE FOR ISLANDING CHARGE LEVEL (90)

FIG. 5C

OPERATING THE MICROGRID CONTROLLER IN A COST OPTIMIZATION MODE DURING WHICH POWER RECEIVED FROM THE SOLAR POWER SOURCE, THE WIND POWER SOURCE, THE BATTERY POWER SOURCE AND/OR THE DIESEL GENERATOR POWER SOURCE ARE PRIORITIZED OVER POWER RECEIVED FROM THE MAIN POWER GRID SOURCE DURING PEAK POWER DEMAND PERIODS OF THE ONE OR MORE MICROGRID LOADS TO REDUCE ENERGY COSTS ASSOCIATED WITH THE MICROGRID — 94

OPERATING THE MICROGRID CONTROLLER IN A CO2 MINIMIZATION MODE WHEN A CO2 EMISSIONS THRESHOLD IS EXCEEDED OR PREDICTED TO BE EXCEEDED FOR THE MICROGRID DURING WHICH POWER RECEIVED FROM THE SOLAR POWER SOURCE, THE WIND POWER SOURCE AND/OR THE BATTERY POWER SOURCE ARE PRIORITIZED OVER POWER RECEIVED FROM THE MAIN POWER GRID SOURCE AND/OR POWER RECEIVED FROM THE DIESEL GENERATOR POWER SOURCE TO REDUCE CO2 EMISSIONS ASSOCIATED WITH THE MICROGRID — 96

THE MICROGRID CONTROLLER RECEIVING A TOTAL ENERGY CONSUMPTION METRIC FOR ENERGY CONSUMED BY THE MICROGRID — 98

WHILE OPERATING IN THE CO2 MINIMIZATION MODE, WHEN THE TOTAL ENERGY CONSUMPTION METRIC EXCEEDS A TOTAL ENERGY CONSUMPTION THRESHOLD, THE MICROGRID CONTROLLER EXITING THE CO2 MINIMIZATION MODE AND ENTERING THE COST OPTIMIZATION MODE — 100

PREDICTING AN OUTAGE DURATION FOR THE PREDICTED LOSS OF POWER FROM THE MAIN POWER GRID SOURCE — 102

PREDICTING A POWER USAGE OF THE ONE OR MORE MICROGRID LOADS DURING THE OUTAGE DURATION — 104

PREDICTING WHETHER THE ONE OR MORE MICROGRID LOADS WILL REMAIN POWERED DURING THE PREDICTED OUTAGE DURATION OF THE PREDICTED LOSS OF POWER FROM THE MAIN POWER GRID SOURCE, AND WHEN IT IS PREDICTED THAT THE ONE OR MORE MICROGRID LOADS WILL NOT REMAIN POWERED DURING THE PREDICTED OUTAGE DURATION OF THE PREDICTED LOSS OF POWER FROM THE MAIN POWER GRID SOURCE, SENDING A NOTIFICATION BEFORE THE LOSS OF POWER FROM THE MAIN POWER GRID SOURCE IS PREDICTED TO OCCUR — 106

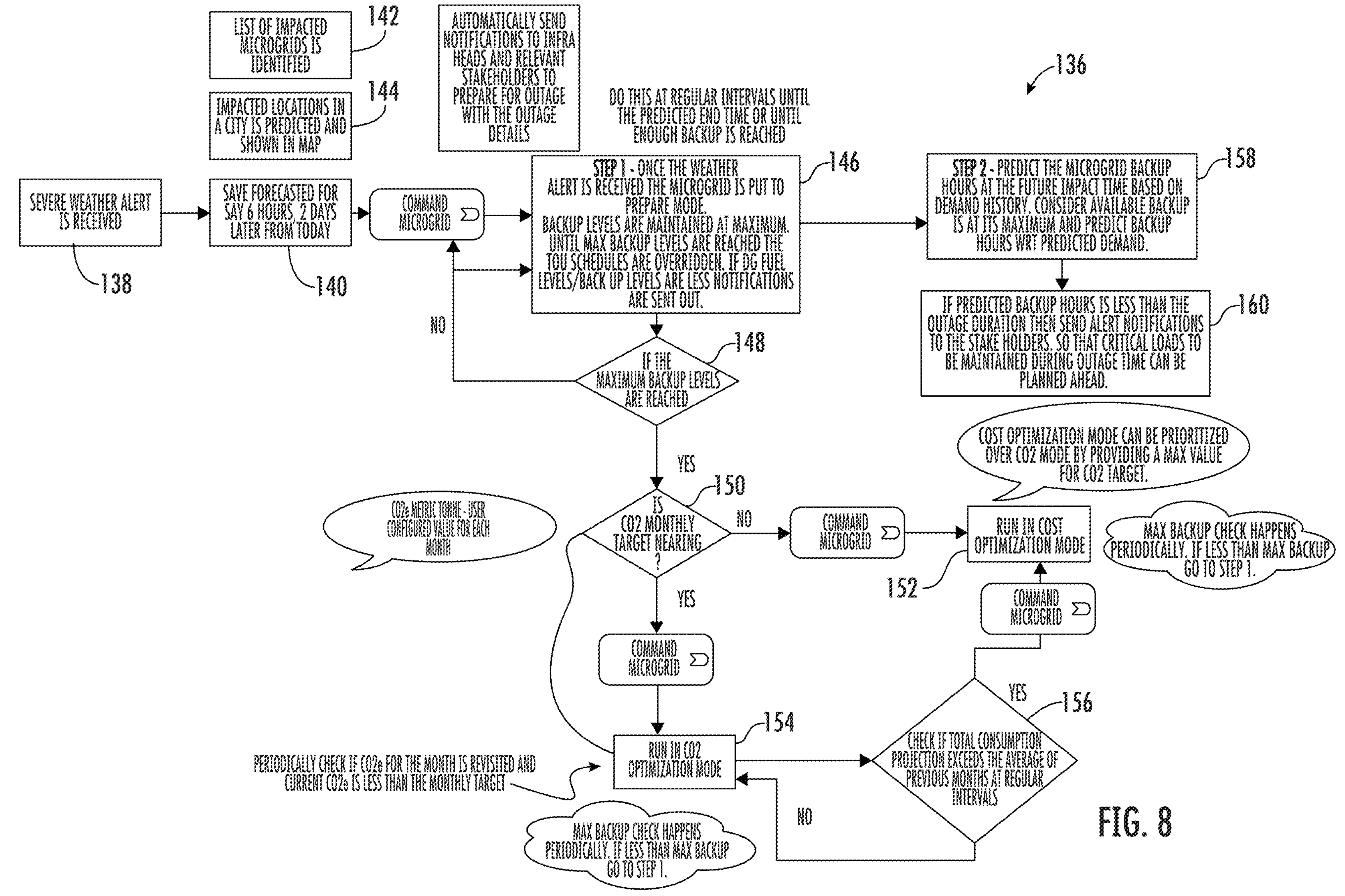
136
SEVERE WEATHER ALERT IS RECEIVED
138
SAVE FORECASTED FOR SAY 6 HOURS, 2 DAYS LATER FROM TODAY
140
LIST OF IMPACTED MICROGRIDS IS IDENTIFIED
142
IMPACTED LOCATIONS IN A CITY IS PREDICTED AND SHOWN IN MAP
144
COMMAND MICROGRID
AUTOMATICALLY SEND NOTIFICATIONS TO INFRA HEADS AND RELEVANT STAKEHOLDERS TO PREPARE FOR OUTAGE WITH THE OUTAGE DETAILS
DO THIS AT REGULAR INTERVALS UNTIL THE PREDICTED END TIME OR UNTIL ENOUGH BACKUP IS REACHED
STEP 1 - ONCE THE WEATHER ALERT IS RECEIVED THE MICROGRID IS PUT TO PREPARE MODE. BACKUP LEVELS ARE MAINTAINED AT MAXIMUM. UNTIL MAX BACKUP LEVELS ARE REACHED THE TOU SCHEDULES ARE OVERRIDDEN. IF DG FUEL LEVELS/BACK UP LEVELS ARE LESS NOTIFICATIONS ARE SENT OUT.
146
IF THE MAXIMUM BACKUP LEVELS ARE REACHED
148
NO
YES
IS CO2 MONTHLY TARGET NEARING ?
150
NO
YES
CO2e METRIC TONNE - USER CONFIGURED VALUE FOR EACH MONTH
COMMAND MICROGRID
RUN IN CO2 OPTIMIZATION MODE
154
PERIODICALLY CHECK IF CO2e FOR THE MONTH IS REVISITED AND CURRENT CO2e IS LESS THAN THE MONTHLY TARGET
MAX BACKUP CHECK HAPPENS PERIODICALLY. IF LESS THAN MAX BACKUP GO TO STEP 1.
COMMAND MICROGRID
RUN IN COST OPTIMIZATION MODE
152
COST OPTIMIZATION MODE CAN BE PRIORITIZED OVER CO2 MODE BY PROVIDING A MAX VALUE FOR CO2 TARGET.
MAX BACKUP CHECK HAPPENS PERIODICALLY. IF LESS THAN MAX BACKUP GO TO STEP 1.
COMMAND MICROGRID
CHECK IF TOTAL CONSUMPTION PROJECTION EXCEEDS THE AVERAGE OF PREVIOUS MONTHS AT REGULAR INTERVALS
156
YES
NO
STEP 2 - PREDICT THE MICROGRID BACKUP HOURS AT THE FUTURE IMPACT TIME BASED ON DEMAND HISTORY. CONSIDER AVAILABLE BACKUP IS AT ITS MAXIMUM AND PREDICT BACKUP HOURS WRT PREDICTED DEMAND.
158
IF PREDICTED BACKUP HOURS IS LESS THAN THE OUTAGE DURATION THEN SEND ALERT NOTIFICATIONS TO THE STAKE HOLDERS, SO THAT CRITICAL LOADS TO BE MAINTAINED DURING OUTAGE TIME CAN BE PLANNED AHEAD.
160
FIG. 8

MICROGRID CONTROLLER AND METHODS FOR CONTROLLING A MICROGRID

RELATED APPLICATIONS

This application claims the benefit of Indian Provisional Application No. 202311070137, filed Oct. 16, 2023, which application is incorporated by reference in its entirety.

TECHNICAL FIELD

The present disclosure relates generally to utility power systems. More particularly, the present disclosure relates to a microgrid controller and methods for controlling a microgrid supplied by a utility power system.

BACKGROUND

Power outages can have a substantial impact on customers in terms of expense and lost productivity. In some cases, microgrids are established to help supply power to critical infrastructure. Each microgrid may have one or more backup power sources, and when main power is lost, the microgrid may be disconnected from the main power grid (e.g. "islanded"), and backup power of the microgrid may be used to supply power to the microgrid loads. When main power is restored, the microgrid may again connect to the main power grid.

Commercial electricity customers are typically billed consumption charges as well as demand charges by the utility. Consumption charges are for the volume of electricity consumed and are often measured in kilowatthours (kWh). Consumption charges are often referred to as energy charges, and typically applicable to residential customers as well. Demand charges, which are typically not applied to residential bills, are billed for the highest level of electricity demand ("peak demand") of a customer during a billing period, often measured in kilowatts (kW). The "peak demand" is typically defined as the highest average electricity usage occurring within a defined time interval (e.g. 15 minutes) during the billing period. For many commercial customers, demand charges can account for 30-70 percent of the total charges on a monthly electric bill. Because peak demand is based on how and when a customer uses electricity, two customers that consume similar amounts of overall electricity can incur very different demand charge expenses depending on their peak demand during the billing period.

What would be desirable are methods and systems to predict possible main power grid outages and enable backup power supplies of a microgrid to be better prepared for an upcoming main power grid outage. What would be desirable are methods and systems for using the one or more backup power sources of a microgrid to reduce peak demand charges levied by a utility for powering the microgrid loads. What would be desirable are methods and systems for controlling use of the main power grid and the one or more backup power sources to reduce $CO_2$ emissions associated with powering the microgrid loads during certain periods of time.

SUMMARY

The present disclosure relates generally to utility power systems, and more particularly to a microgrid controller and methods for controlling a microgrid supplied by a utility power system. An example may be found in a method for controlling a microgrid using a microgrid controller. In this example, the microgrid has access to two or more energy sources and provides power to one or more microgrid loads. The two or more energy sources include a main power grid source, a battery power source, a diesel generator power source and one or more of a solar power source and a wind power source. The microgrid controller is configured to control power delivery from each of the two or more energy sources to the one or more microgrid loads. The method includes predicting when a loss of power from the main power grid source is predicted to occur in the future (e.g. a predicted weather event). The microgrid controller is operated in a prepare for islanding mode when the loss of power from the main power grid source is predicted to occur in the future, during which power received from the main power grid source, the solar power source and/or the wind power source are prioritized over energy costs and $CO_2$ emissions associated with the microgrid to charge the battery power source to at least a prepare for islanding charge level. The microgrid controller is operated in an islanding mode when a loss of power from the main power grid source occurs, during which power received from the solar power source, the wind power source, the battery power source and/or the diesel generator power source are prioritized to maximize a time that the microgrid can remain powered during the loss of power from the main power grid source.

Another example may be found in a method for controlling a microgrid using a microgrid controller. The microgrid has access to two or more energy sources and provides power to one or more microgrid loads. The two or more energy sources include a main power grid source, a battery power source, a diesel generator power source and one or more of a solar power source and a wind power source. The microgrid controller is configured to control power delivery from each of the two or more energy sources to the one or more microgrid loads. The method includes operating the microgrid controller in a cost optimization mode during which power received from the solar power source, the wind power source, the battery power source and/or the diesel generator power source are prioritized over power received from the main power grid source during peak power demand periods of the one or more microgrid loads to reduce energy costs associated with the microgrid. The method includes operating the microgrid controller in a $CO_2$ minimization mode when a $CO_2$ emissions threshold is exceeded or predicted to be exceeded for the microgrid during which power received from the solar power source, the wind power source and/or the battery power source are prioritized over power received from the main power grid source and/or power received from the diesel generator power source to reduce $CO_2$ emissions associated with the microgrid.

Another example may be found in a microgrid controller for controlling a microgrid that has access to two or more energy sources and provides power to one or more microgrid loads. The two or more energy sources include a main power grid source, a battery power source, a diesel generator power source and one or more of a solar power source and a wind power source. The microgrid controller includes one or more switching elements for controlling power delivery from each of the two or more energy sources to the one or more microgrid loads, and a controller that is operatively coupled to the one or more switching elements. The controller is configured to operate in a cost optimization mode during which power received from the solar power source, the wind power source, the battery power source and/or the diesel generator power source are prioritized over power received from the main power grid source during peak power demand periods of the one or more microgrid loads to reduce energy costs associated with the microgrid. The controller is configured to operate in a prepare for islanding mode when a loss of power from the main power grid source is predicted to occur in the future, during which power received from the main power grid source, the solar power source and/or the wind power source are prioritized over energy costs and $CO_2$ emissions associated with the microgrid to charge the battery power source to at least a prepare for islanding charge level. The controller is configured to operate in an islanding mode when a loss of power from the main power grid source occurs, during which power received from the solar power source, the wind power source, the battery power source and/or the diesel generator power source are prioritized to maximize a time that the microgrid can remain powered during the loss of power from the main power grid source.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIGS. 5A, 5B and 5C are flow diagrams that together show an illustrative method for controlling a microgrid using a microgrid controller such as the illustrative microgrid controller of FIG. 4;

FIGS. 6A and 6B are flow diagrams that together show an illustrative method for controlling a microgrid using a microgrid controller such as the illustrative microgrid controller of FIG. 4;

FIG. 8 is a flow diagram showing an illustrative method;

Figures 1, 2:
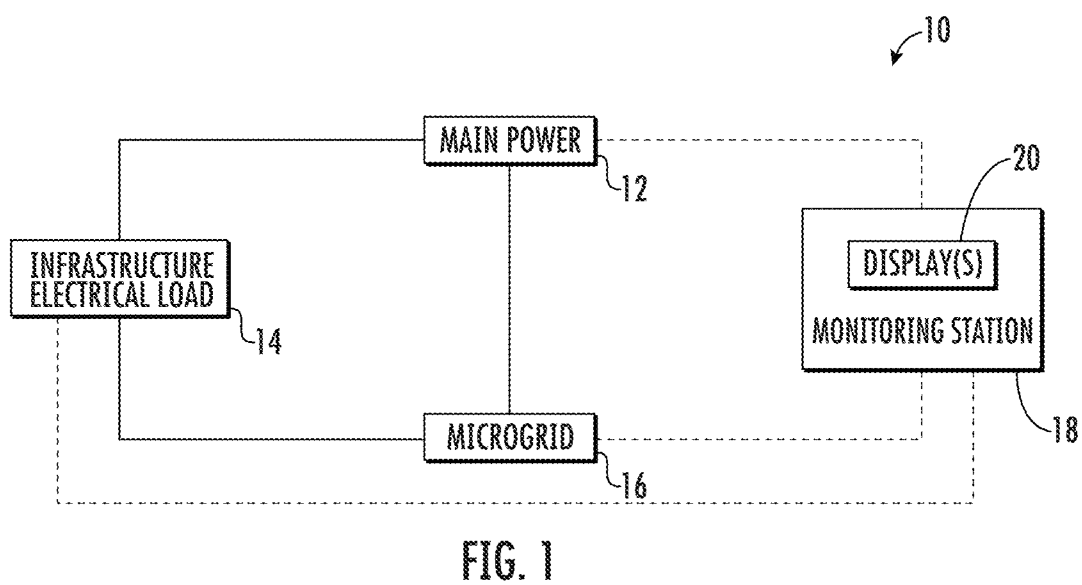
FIG. 1 is a schematic block diagram showing an illustrative power system.
FIG. 2 is a schematic diagram showing an illustrative architecture for monitoring the illustrative power system of FIG. 1.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

Power outages can have a substantial impact on customers in terms of expense and lost productivity. City administrators have an interest in seeing the frequency and duration of power outages in which main power is unavailable. City administrators have an interest in seeing how well backup power supplies such as a microgrid function to provide power when main power is not available, or is available but not sufficient to cover a current electrical load. When main power is available, a microgrid is electrically coupled to and recharged by main power. When main power is lost, a microgrid (which may be battery powered, solar and/or wind powered, for example) becomes islanded, meaning that the microgrid is temporarily isolated from main power. When islanded, the microgrid provides emergency power to infrastructure that is connected to the microgrid. During the main power outage, the duration of the main power outage is monitored. During the main power outage, the performance of the microgrid is monitored. This includes monitoring how long the microgrid is able to provide emergency power to the islanded infrastructure before the backup power supply of the microgrid is depleted. This data is aggregated for a number of outages for a period of time for each of the microgrid supported city infrastructure. A dashboard may be generated and displayed that shows each outage and the accompanying performance statistics.

FIG. 1 is a schematic block diagram showing an illustrative power system 10. The power system 10 includes Main Power 12, which represents the main power grid. The main power grid may be powered by one or more of a plurality of different electricity-generating plants, including coal-fired power plants, oil-fired power plants, natural gas-fired power plants, hydroelectric power plants and nuclear power plants. The main power grid may also be supplied via solar power, wind power and/or hydroelectric power, for example. The Main Power 12 provides electrical power to an Infrastructure Electrical Load 14, which may represent any of a variety of different electrical loads. The Infrastructure Electrical Load 14 may represent a water treatment facility, a sewage treatment facility, a police station, a fire station, a military base, a factory, a retail operation and/or other electrical loads. In some cases, the Infrastructure Electrical Load 14 may represent infrastructure that is deemed critical enough that backup power is desired. A Microgrid 16 includes a backup power supply that may be charged or recharged via the Main Power 12 when the Main Power 12 is online. The Microgrid 16 may provide electrical power to the Infrastructure Electrical Load 14 when the Main Power 12 is offline. In some instances, the Microgrid 16 may provide some or all electrical power to the Infrastructure Electrical Load 14 when the Main Power 12 is online, but is not able to meet the current load requirements of the Infrastructure Electrical Load 14. In some instances, the Microgrid 16 may provide some or all electrical power to the Infrastructure Electrical Load 14 when the Main Power 12 is online during peak demand periods to reduce the amount of peak power drawn from the Main Power 12. In some instances, the Microgrid 16 may provide some or all electrical power to the Infrastructure Electrical Load 14 when the Main Power 12 is online to reduce $CO_2$ emissions associated with energy consumption of the Infrastructure Electrical Load 14. These are just examples.

In the example shown, there are electrical conductors such as wires (shown in solid line) extending between the Main Power 12 and the Microgrid 16. There are also electrical conductors such as wires (shown in solid line) extending between the Main Power 12 and the Infrastructure Electrical Load 14. There are also electrical conductors such as wires (shown in solid line) extending between the microgrid 16 and the Infrastructure Electrical Load 14.

In some instances, a Monitoring Station 18 may be configured to monitor the performance of the Main Power 12, the Infrastructure Electrical Load 14, and the Microgrid 16. In some cases, there are communication lines (shown in dashed line) extending from the Monitoring Station 18 to each of the Main Power 12, the Infrastructure Electrical Load 14, and the Microgrid 16. These communication lines may be electrically coupled with sensors and/or controllers (not shown) that are located within each of the Main Power 12, the Infrastructure Electrical Load 14, and the Microgrid 16. The Monitoring Station 18 includes a Display 20 that can be used for displaying dashboards, for example, that provide an operator or other observer with information regarding the performance of any of the Main Power 12, the Infrastructure Electrical Load 14, and/or the Microgrid 16. The Monitoring Station 18 may also include computing power that allows the Monitoring Station 18 to collect and process the variety of collected information and generate and display appropriate dashboards on the Display 20. In some instances, the Main Power 12, the Infrastructure Electrical Load 14, and the Microgrid 16 may be monitored using other architectures. Example dashboard displays are shown in FIGS. 9-16.

FIG. 2 provides an example of another architecture for monitoring the Main Power 12, the Infrastructure Electrical Load 14, and the Microgrid 16. Starting at the bottom of FIG. 2, each Microgrid 16 may include a Microgrid Controller (ECS) 22 communicating with a number of RTUs (Remote Terminal Unit) 24. Each of the RTU units 24 communicate with a backup power source (e.g. battery, solar, wind, diesel generator), a main power source 12 and/or one or more Infrastructure electrical loads. In the example shown, each of the Microgrid Controllers 22 communicate with a SCADA system (Supervisory Control And Data Acquisition) 26. The SCADA system 26 may be used to gather data in real time from remote locations in order to monitor and/or control equipment and conditions. In the example shown, the SCADA system 26 reports up to a City Suite Platform 28, which in turn communicates with a City Suite Operator Application 30. The SCADA system 26, City Suite Platform 28, and City Suite Operator Application 30 may be one example implementation of the Monitoring Station 18 of FIG. 1.

Figure 3:
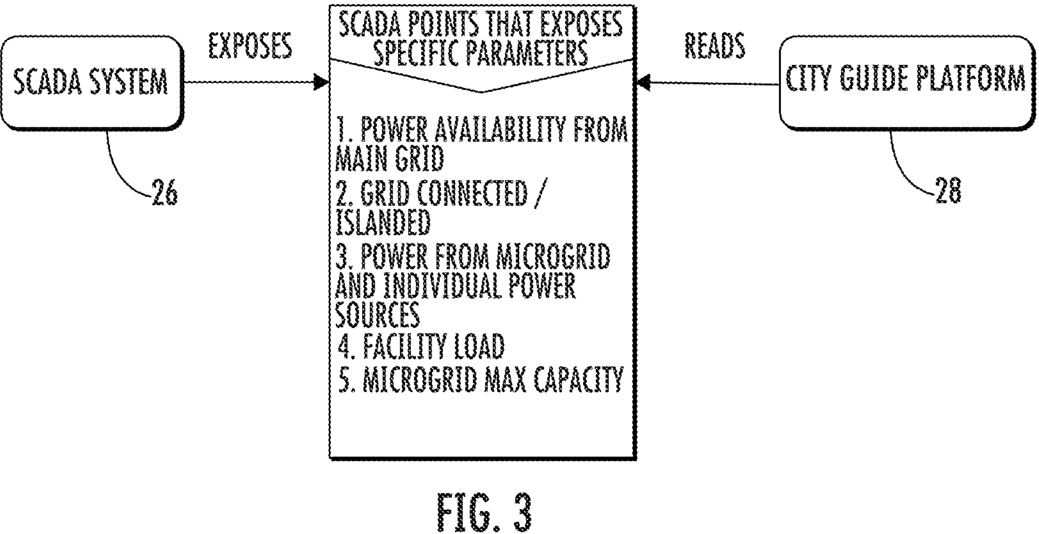
FIG. 3 is a schematic diagram showing communication within the illustrative architecture of FIG. 2.

FIG. 3 is a graphical representation of communication between the SCADA system 26 and the City Suite Platform 28. In the example shown, the SCADA system 26 reports points that expose specific parameters and the City Suite Platform 28 reads those points. The points include power availability from the Main Power 12, whether the Microgrid 16 is connected or islanded, power availability from the Microgrid 16 and other power sources, facility load for each of the facilities, and the maximum capacity of the Microgrid 16. These are just example points. In some instances, at least some of the information provided to the City Suite Platform 28 may be provided up to the City Suite Operator Application 30, for example.

Figure 4:
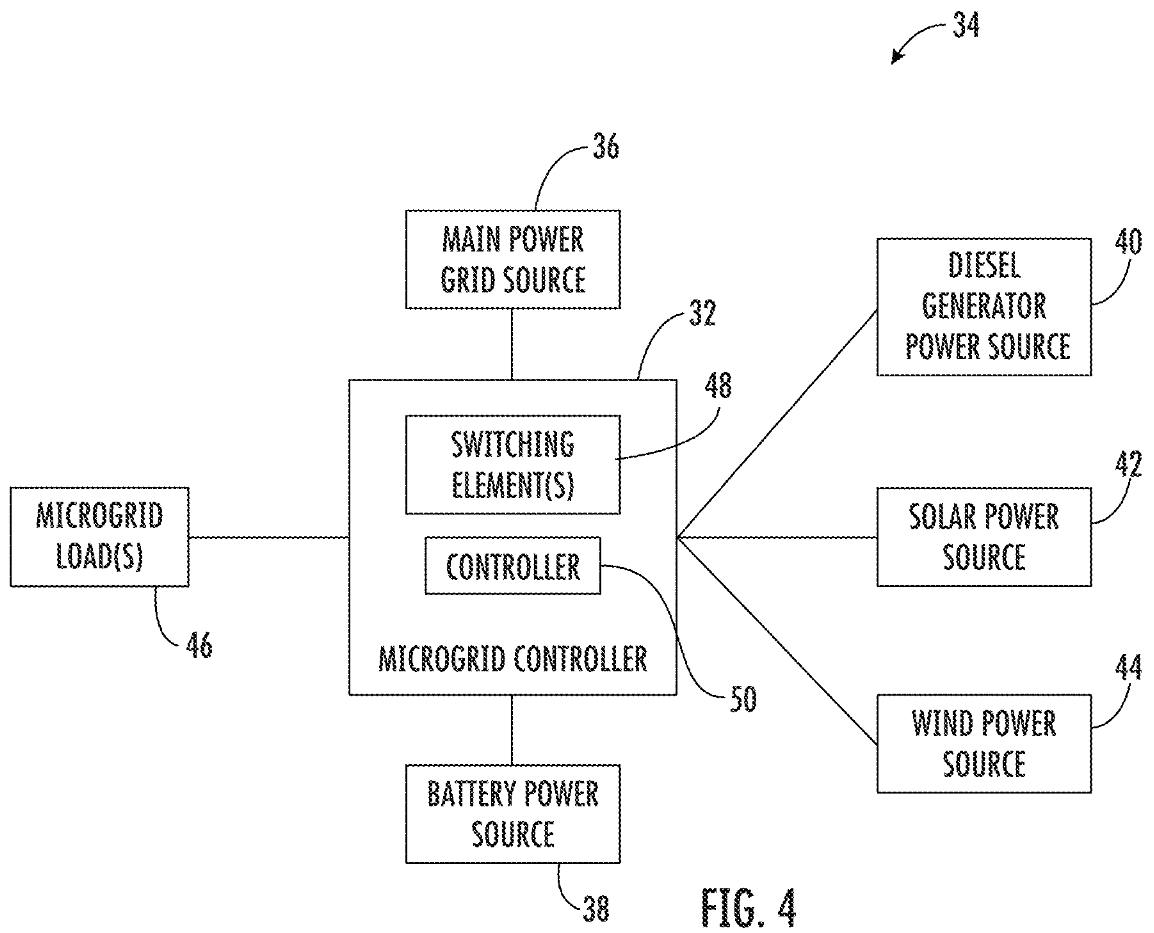
FIG. 4 is a schematic block diagram showing an illustrative microgrid controller.

FIG. 4 is a schematic block diagram showing an illustrative microgrid controller 32. The illustrative microgrid controller 32 may be considered as being an example of the microgrid controllers 22 shown in FIG. 2. The microgrid controller 32 may be considered as being part of a microgrid 34. The microgrid 34 includes or has access to two or more energy sources including a main power grid source 36, a battery power source 38, a diesel generator power source 40, a solar power source 42 and a wind power source 44. While not shown, additional power sources such as geothermal energy and water-powered power generation such as a turbine powered by water falling through a dam are also contemplated. The microgrid 34 provides power to one or more microgrid loads 46. The microgrid loads 46 may include any industrial or commercial power consuming operation or process, for example. The microgrid controller 32 includes one or more switching elements 48 for control power delivery from each of the two or more energy sources 36, 38, 40, 42 and 44 to the one or more microgrid loads 46 as well as a controller 50 that is operatively coupled to the one or more switching elements 48.

In some cases, the controller 50 is configured to operate in a cost optimization mode during which power received from the solar power source 42, the wind power source 44, the battery power source 38 and/or the diesel generator power source 40 are prioritized over power received from the main power grid source 36 during peak power demand periods of the one or more microgrid loads 46 to reduce energy costs associated with the microgrid 34. The controller 50 is configured to operate in a prepare for islanding mode when a loss of power from the main power grid source 36 is predicted to occur in the future (e.g. via a predicted weather event, a predicted maintenance event, a predicted high load event that cannot be serviced by the main power supply, a predicted instability in the power grid, a predicted redirection of available power away from main grid servicing the microgrid, etc.), during which power received from the main power grid source 36, the solar power source 42 and/or the wind power source 44 are prioritized over energy costs and $CO_2$ emissions associated with the microgrid 34 to charge the battery power source 38 quickly to at least a "prepare for islanding" charge level. The controller 50 is configured to operate in an islanding mode when a loss of power from the main power grid source 36 occurs, during which power received from the solar power source 42, the wind power source 44, the battery power source 38 and/or the diesel generator power source 40 are prioritized to maximize a time that the microgrid 34 can remain powered during the loss of power from the main power grid source 36. In some cases, the controller 50 may be configured to operate in a $CO_2$ minimization mode when a $CO_2$ emissions threshold is exceeded or predicted to be exceeded for the microgrid 34 during which power received from the solar power source 42, the wind power source 44 and/or the battery power source 38 are prioritized over power received from the main power grid source 36 and/or power received from the diesel generator power source 40 to reduce $CO_2$ emissions associated with the microgrid.

Figure 5B:
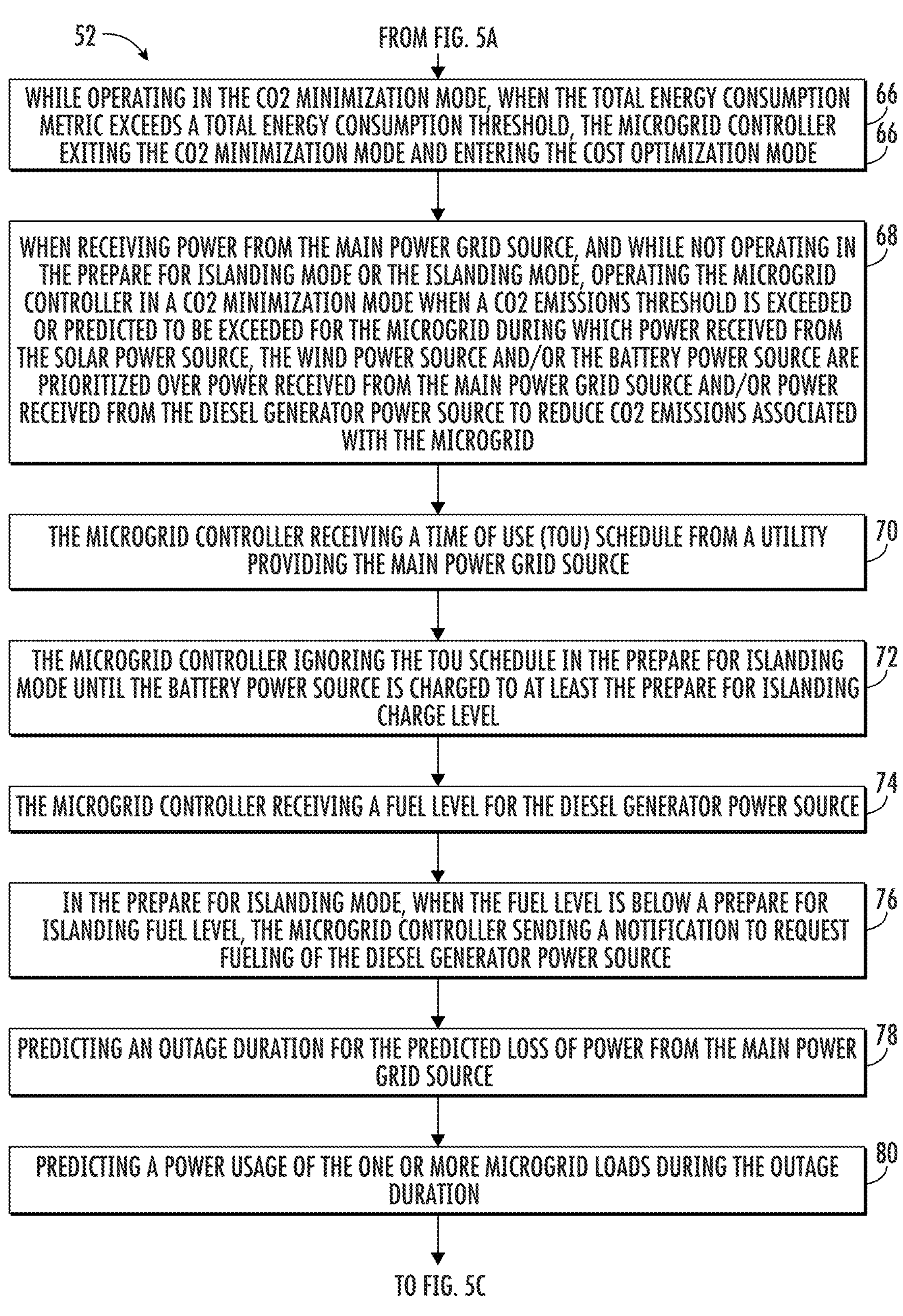

FIGS. 5A, 5B and 5C are flow diagrams that together show an illustrative method 52 for controlling a microgrid (such as the microgrid 34) using a microgrid controller (such as the microgrid controller 32). The microgrid has access to two or more energy sources and provides power to one or more microgrid loads such as the microgrid loads 46. The two or more energy sources may include a main power grid source (such as the main power grid source 36), a battery power source (such as the battery power source 38), a diesel generator power source (such as the diesel generator power source 40) and one or more of a solar power source (such as the solar power source 42) and a wind power source (such as the wind power source 44). The microgrid controller is configured to control power delivery from each of the two or more energy sources to the one or more microgrid loads. The method 52 includes predicting when a loss of power from the main power grid source is predicted to occur in the future, as indicated at block 54. In some cases, the microgrid controller is operated in a prepare for islanding mode when the loss of power from the main power grid source is predicted to occur in the future, during which power received from the main power grid source, the solar power source and/or the wind power source are prioritized over energy costs and $CO_2$ emissions associated with the microgrid to charge the battery power source to at least a prepare for islanding charge level, as indicated at block 56. In some cases, the microgrid controller is operated in an islanding mode when a loss of power from the main power grid source occurs, during which power received from the solar power source, the wind power source, the battery power source and/or the diesel generator power source are prioritized to maximize a time that the microgrid can remain powered during the loss of power from the main power grid source, as indicated at block 58.

When receiving power from the main power grid source, and while not operating in the prepare for islanding mode or the islanding mode, the method 52 may include operating the microgrid controller in a cost optimization mode during which power received from the solar power source, the wind power source, the battery power source and/or the diesel generator power source are prioritized over power received from the main power grid source at least during peak power demand periods of the one or more microgrid loads to reduce energy costs associated with the microgrid, as indicated at block 60. In some cases, when receiving power from the main power grid source, and while not operating in the prepare for islanding mode or the islanding mode, the method 52 may include operating the microgrid controller in a $CO_2$ minimization mode when, for example, a $CO_2$ emissions threshold is exceeded or predicted to be exceeded for the microgrid during which power received from the solar power source, the wind power source and/or the battery power source are prioritized over power received from the main power grid source and/or power received from the diesel generator power source to reduce $CO_2$ emissions associated with the microgrid, as indicated at block 62. In some cases, the microgrid controller may receive a total energy consumption metric for energy consumed by the microgrid, as indicated at block 64. Continuing on FIG. 5B, the method 52 may include, while operating in the $CO_2$ minimization mode, when the total energy consumption metric exceeds a total energy consumption threshold (e.g. total energy consumption exceeds a monthly threshold limit, at which point the cost of the energy may be increased), exiting the $CO_2$ minimization mode and entering the cost optimization mode, as indicated at block 66.

In some cases, when receiving power from the main power grid source, and while not operating in the prepare for islanding mode or the islanding mode, the method 52 may include operating the microgrid controller in a $CO_2$ minimization mode when a $CO_2$ emissions threshold is exceeded or predicted to be exceeded for the microgrid during which power received from the solar power source, the wind power source and/or the battery power source are prioritized over power received from the main power grid source and/or power received from the diesel generator power source to reduce $CO_2$ emissions associated with the microgrid, as indicated at block 68. In some cases, the microgrid controller may receive a Time of Use (TOU) schedule from a utility providing the main power grid source, as indicated at block 70. The microgrid controller may follow the TOU schedule to reduce energy costs, but may ignore the TOU schedule in the prepare for islanding mode until the battery power source is charged to at least the "prepare for islanding" charge level, as indicated at block 72.

In some cases, the microgrid controller may receive a fuel level for the diesel generator power source, as indicated at block 74. In the prepare for islanding mode, when the fuel level is below a "prepare for islanding" fuel level, the microgrid controller may send a notification to request refueling of the diesel generator power source, as indicated at block 76.

In some cases, the method 52 may include predicting an outage duration for the predicted loss of power from the main power grid source, as indicated at block 78. A power usage of the one or more microgrid loads during the outage duration may be predicted, as indicated at block 80. Continuing on FIG. 5C, the method 52 may include predicting whether the one or more microgrid loads will remain powered during the predicted outage duration of the predicted loss of power from the main power grid source, and when it is predicted that the one or more microgrid loads will not remain powered during the predicted outage duration of the predicted loss of power from the main power grid source, sending a notification before the loss of power from the main power grid source is predicted to occur, as indicated at block 82. In some cases, one or more of the microgrid loads may be shut down or otherwise operated in a more energy efficient manner to extend the time that the one or more microgrid loads will remain powered during the predicted outage.

In some cases, after the battery power source is charged to at least the "prepare for islanding" charge level in the prepare for islanding mode, the method 52 may include operating the microgrid controller in a cost optimization mode during which power received from the solar power source, the wind power source, the battery power source and/or the diesel generator power source are prioritized over power received from the main power grid source during peak power demand periods of the one or more microgrid loads to reduce energy costs associated with the microgrid, as indicated at block 84. The method 52 may further include checking whether the battery power source has discharged below the "prepare for islanding" charge level by more than a threshold amount, and if so, returning to the prepare for islanding mode to re-charge the battery power source to at least the "prepare for islanding" charge level, as indicated at block 86.

In some cases, after the battery power source is charged to at least the "prepare for islanding" charge level in the prepare for islanding mode, the method 52 may include operating the microgrid controller in a $CO_2$ minimization mode when a $CO_2$ emissions threshold is exceeded or predicted to be exceeded for the microgrid during which power received from the solar power source, the wind power source and/or the battery power source are prioritized over power received from the main power grid source and/or power received from the diesel generator power source to reduce $CO_2$ emissions associated with the microgrid, as indicated at block 88. In some cases, the method 52 may include checking whether the battery power source has discharged below the "prepare for islanding" charge level by more than a threshold amount, and if so, returning to the prepare for islanding mode to re-charge the battery power source to at least the "prepare for islanding" charge level, as indicated at block 90.

Figure 6B:
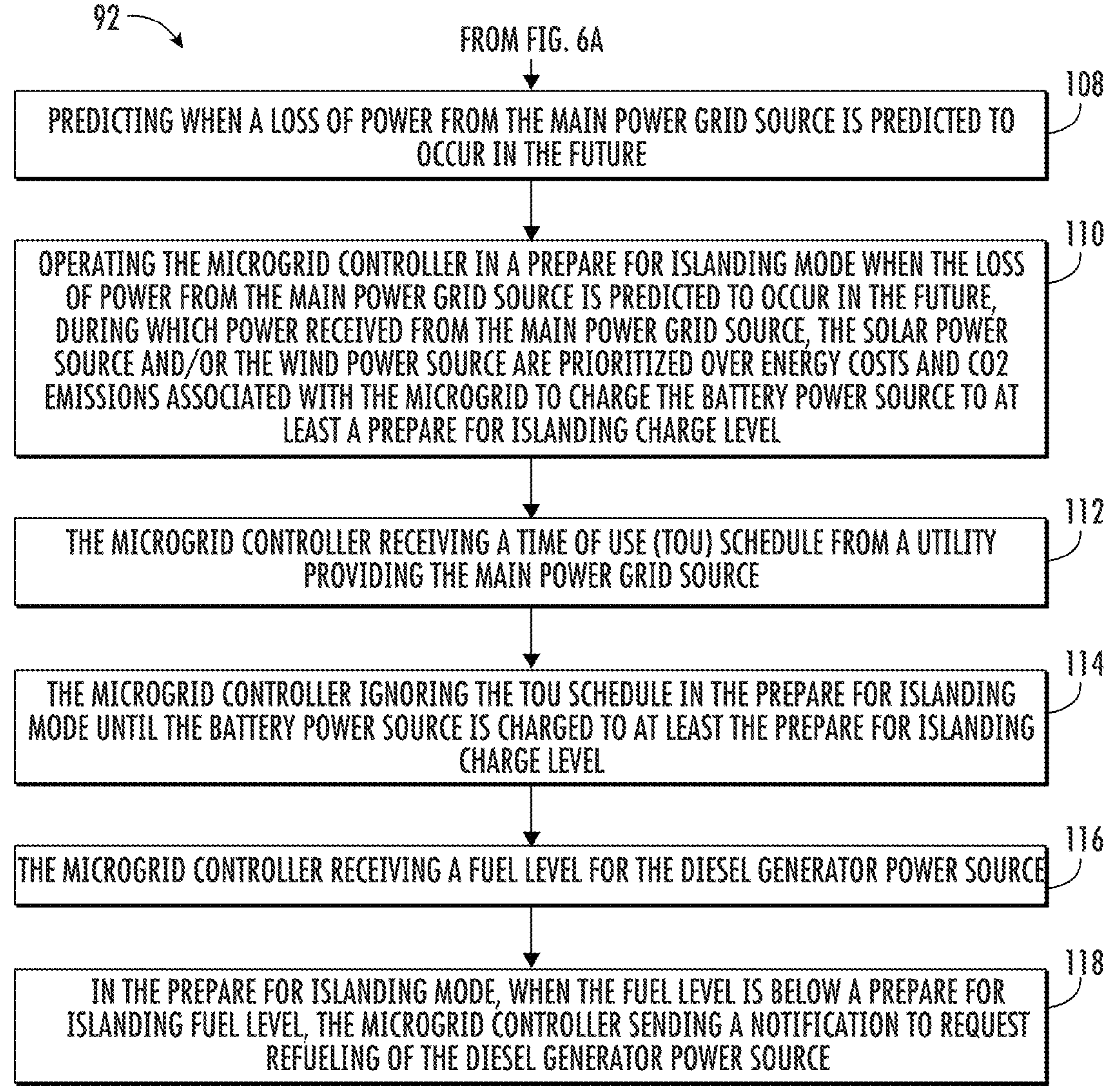

FIGS. 6A and 6B are flow diagrams that together show an illustrative method 92 for controlling a microgrid (such as the microgrid 34) using a microgrid controller (such as the microgrid controller 32). The microgrid has access to two or more energy sources and provides power to one or more microgrid loads such as the microgrid loads 46. In some cases, the two or more energy sources include a main power grid source (such as the main power grid source 36), a battery power source (such as the battery power source 38), a diesel generator power source (such as the diesel generator power source 40) and one or more of a solar power source (such as the solar power source 42) and a wind power source (such as the wind power source 44). The microgrid controller is configured to control power delivery from each of the two or more energy sources to each of the one or more microgrid loads. The method 92 includes operating the microgrid controller in a cost optimization mode during which power received from the solar power source, the wind power source, the battery power source and/or the diesel generator power source are prioritized over power received from the main power grid source during peak power demand periods of the one or more microgrid loads to reduce energy costs associated with the microgrid, as indicated at block 94. The method 92 includes operating the microgrid controller in a $CO_2$ minimization mode when a $CO_2$ emissions threshold is exceeded or predicted to be exceeded for the microgrid during which power received from the solar power source, the wind power source and/or the battery power source are prioritized over power received from the main power grid source and/or power received from the diesel generator power source to reduce $CO_2$ emissions associated with the microgrid, as indicated at block 96. In some cases, the microgrid controller receives a total energy consumption metric for energy consumed by the microgrid, as indicated at block 98. While operating in the $CO_2$ minimization mode, when the total energy consumption metric exceeds a total energy consumption threshold, the microgrid controller exits the $CO_2$ minimization mode and enters the cost optimization mode, as indicated at block 100.

In some cases, the method 92 may include predicting an outage duration for the predicted loss of power from the main power grid source, as indicated at block 102. A power usage of the one or more microgrid loads during the outage duration may be predicted, as indicated at block 104. In some cases, the power usage of the one or more microgrid loads may be based at least in part on prior power usage under similar conditions (e.g. time, environmental conditions, etc.). A prediction may be made as to whether the one or more microgrid loads will remain powered during the predicted outage duration of the predicted loss of power from the main power grid source, and when it is predicted that the one or more microgrid loads will not remain powered during the predicted outage duration of the predicted loss of power from the main power grid source. When it is predicted that the one or more microgrid loads will not remain powered during the predicted outage duration of the predicted loss of power from the main power grid source, the method 92 may include sending a notification before or after the loss of power from the main power grid source is predicted to occur, as indicated at block 106.

Continuing on FIG. 6B, the method 92 may include predicting when a loss of power from the main power grid source is predicted to occur in the future, as indicated at block 108. The microgrid controller may be operated in a prepare for islanding mode when the loss of power from the main power grid source is predicted to occur in the future, during which power received from the main power grid source, the solar power source and/or the wind power source are prioritized over energy costs and $CO_2$ emissions associated with the microgrid to charge the battery power source to at least a "prepare for islanding" charge level, as indicated at block 110.

In some cases, the microgrid controller may receive a Time of Use (TOU) schedule from a utility providing the main power grid source, as indicated at block 112. The TOU schedule may be ignored in the prepare for islanding mode until the battery power source is charged to at least the "prepare for islanding" charge level, as indicated at block 114. In some cases, the microgrid controller may receive a fuel level for the diesel generator power source, as indicated at block 116. In the prepare for islanding mode, when the fuel level is below a "prepare for islanding" fuel level, the method 92 may include sending a notification to request refueling of the diesel generator power source, as indicated at block 118.

Figure 7:
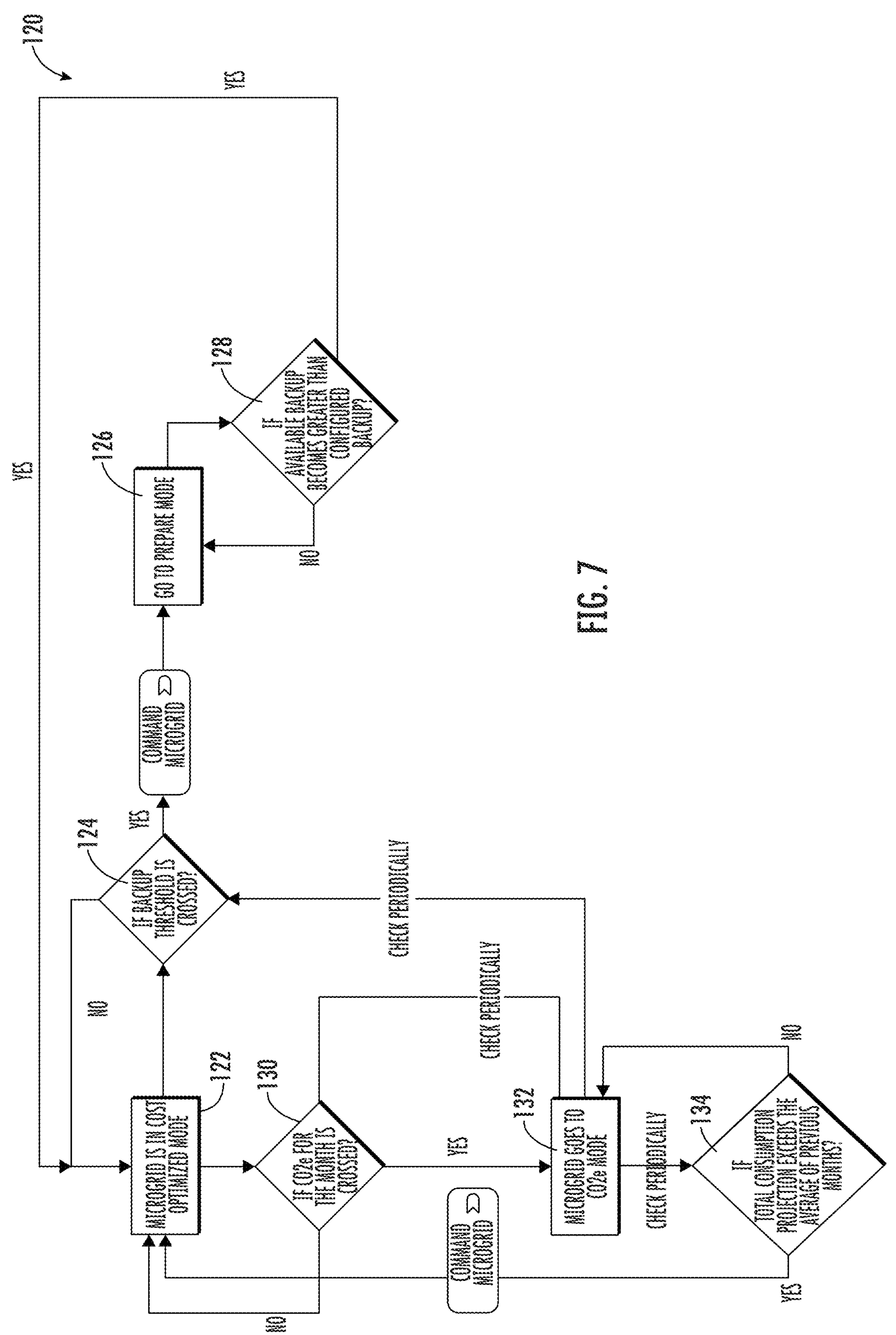
FIG. 7 is a flow diagram showing an illustrative method.

FIG. 7 is a flow diagram showing an illustrative method 120. The method 120 may be considered as representing operation when no power interruptions are expected in the near future. The microgrid may be operated in a cost optimizing mode, as indicated at block 122. If a first battery backup threshold is crossed (e.g. the battery has discharged below a minimum threshold charge level), as indicated at decision block 124, the microgrid may go into a prepare for islanding mode, as indicated at block 126. If not, control reverts to block 122. Once the prepare for islanding mode has begun, the backup battery begins charging from the main power grid. A determination is made at decision block 128 as to whether the backup battery charge level has reached a configured second battery backup threshold. If so, control reverts to block 122. If not, control returns to block 126.

A determination is made at decision block 130 as to whether the $CO_2$ production for the current month has crossed a $CO_2$ threshold. If not, control reverts to block 122. If so, control passes to block 132, where the microgrid goes into $CO_2$ minimization mode. A determination is made at decision block 134 as to whether total energy consumption projection for the month exceeds a running history. If not, control reverts to block 132. If so, control reverts to block 122. The determinations made at decision blocks 124, 130 and 132 are repeated periodically.

FIG. 8 is a flow diagram showing an illustrative method 136. The method 136 may be considered as representing operation when power interruptions are expected in the near future. The method 136 begins at block 138, with receipt of a severe weather alert. While a severe weather alert is used as an example, it is contemplated that any suitable event may be received such as a predicted maintenance event, a predicted high load event that cannot be serviced by the main power supply, a predicted instability in the power grid, a predicted redirection of available power away from main grid servicing the microgrid, etc. An energy consumption forecast is predicted for a period of time corresponding to when the severe weather is expected, as indicated at block 140. In some cases, this may include listing possibly impacted microgrids, as indicated at block 142, and determining and displaying impacted locations, as indicated at block 144. The impacted microgrids are put into prepare for islanding mode, as indicated at block 146. In the prepare for islanding mode, the back batteries are charged. A determination is made at decision block 148 as to whether maximum backup levels have been reached while in the prepare for islanding mode. If no, control reverts to block 146, and charging continues. If so, control passes to decision block 150 where a determination is made as to whether a monthly CO2 limit is being approached. If not, control passes to block 152. However, if the monthly CO2 limit is being approached, control passes to block 154, where the microgrid runs in a CO2 optimization mode. A determination is made at decision block 156 as to whether the total energy consumption projection (e.g. monthly projection) exceeds a threshold total energy consumption level (e.g. the average of one or more previous month total energy consumption levels). If so, control passes to block 152 and the microgrid runs in cost optimization mode. If not, control reverts to block 154 and the microgrid runs in the CO2 optimization mode. In some cases, the method 136 includes a step 2, as indicated at block 158, where the number of backup hours that can be sustained are predicted based at least in part on demand history of the loads. If the prediction indicates that there is not enough backup power for the predicted duration of the power interruption, notifications may be sent out to power consumers, as indicated at block 160.

With brief reference to FIG. 1, the display 20 that is part of the monitoring station 18 may be used to display a variety of different dashboards that provide information regarding the power system 10. It will be appreciated that the display 20 may include more than one separate monitor. In some cases, the display 20 may have a single large screen that is divided into multiple sections. As an example, a first display (or first portion of a display) may be used as an alert view monitor and as the dashboard monitor. A center display may be used for viewing maps of the city. A right hand display may be used for video management and may display video from one or more video cameras placed throughout the city. It will be appreciated that this is merely illustrative, as any number of displays may be utilized, and the information displayed on each display may be different. In some instances, a single large monitor may be subdivided into smaller sections that each display different information, for example. In some instances, the display 20 may include one, four, five or more monitors. Information may be displayed synchronously across each of the monitors shown.

Figure 9:
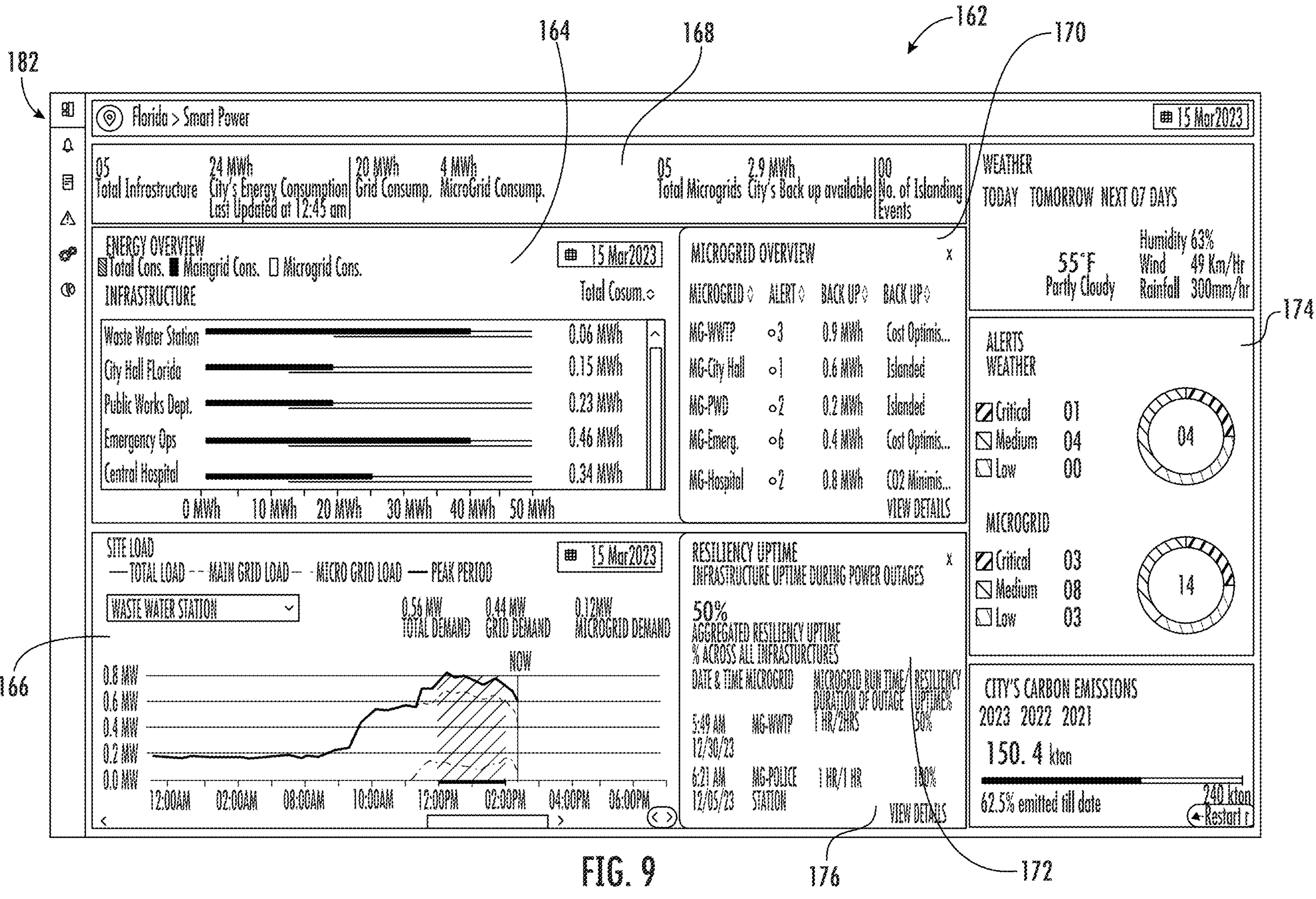
FIG. 9 is a screen shot showing an illustrative display that may be displayed by the city suite operator application of FIG. 2.

FIG. 9 shows an example main dashboard 162 that displays various information. The main dashboard 162 includes an Energy Overview widget 164 that shows both main grid power consumption and Microgrid power consumption across a number of different infrastructure (e.g. facilities). Below the Energy Overview widget 164 is a Site Load widget 166 that displays power consumption over time by a single facility, in this case the Waste Water Station. The particular facility may be selected using a drop-down menu. Above the Energy Overview widget 164 is a Summary widget 168 that shows total city power consumption. To the right of the Energy Overview widget 164, a Microgrid Overview widget 170 provides status information for each of a number of individual Microgrids of the city. A Resiliency Uptime widget 172 under the Microgrid Overview widget 170 shows overall Microgrid availability (relative to all Main Power outages). This data is an aggregated percentage for the city, across all infrastructures. A Weather Alerts widget 174 provides details regarding weather and system alerts.

Figure 10:
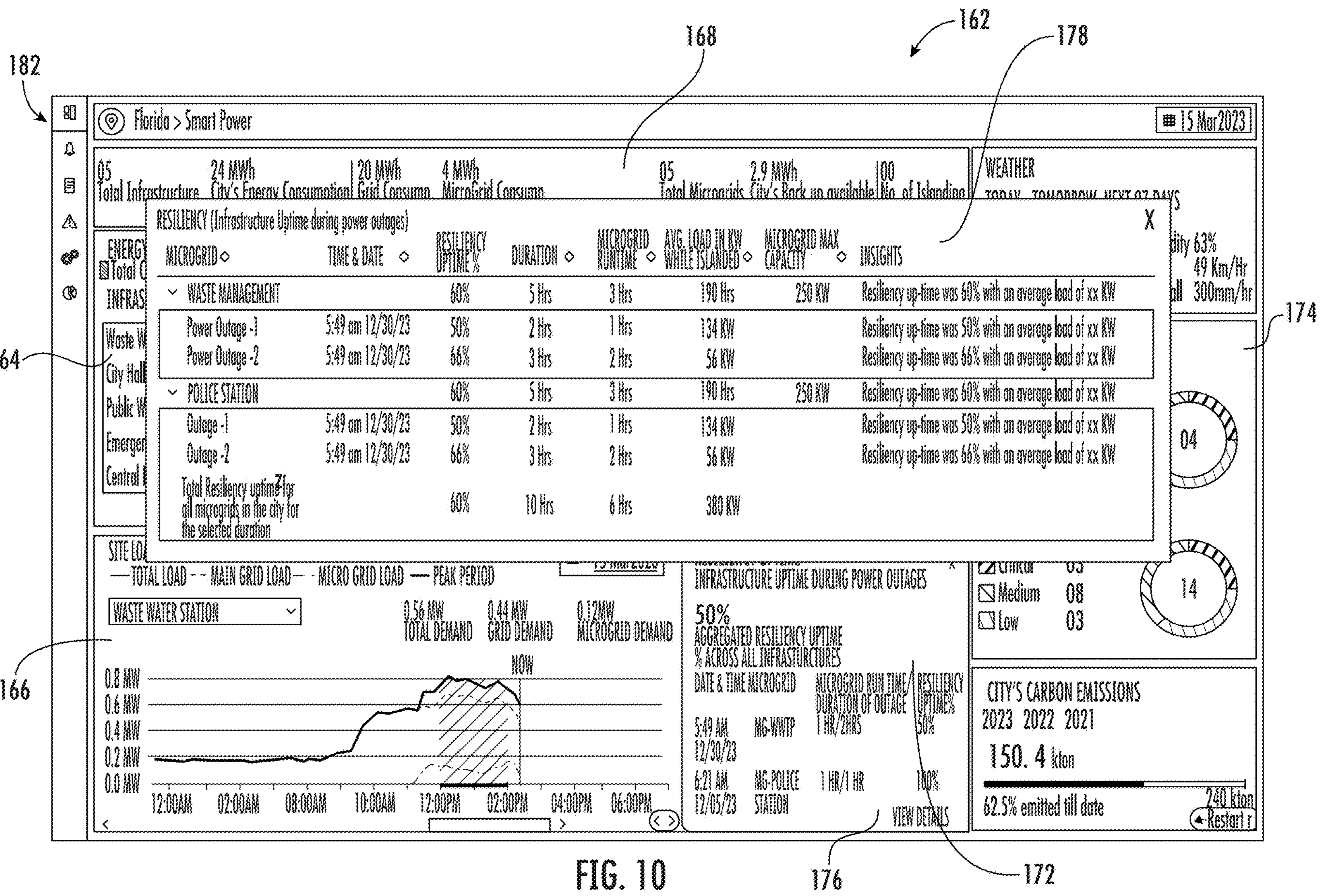
FIG. 10 is a screen shot showing an illustrative display that may be displayed by the city suite operator application of FIG. 2.

FIG. 10 shows an example resiliency uptime popup 178 that may be reached by clicking on a VIEW DETAILS button 176 of the Resiliency Uptime widget 172 of FIG. 9. The resiliency uptime popup 178 includes details for each Main Power outage, for each facility and each Microgrid involved. Displayed information includes time and date of each outage, duration of each outage, Microgrid runtime (how long the backup was running, average site load (roughly the average site load of that duration), and Microgrid capacity (maximum power capacity of the Microgrid).

Figure 11:
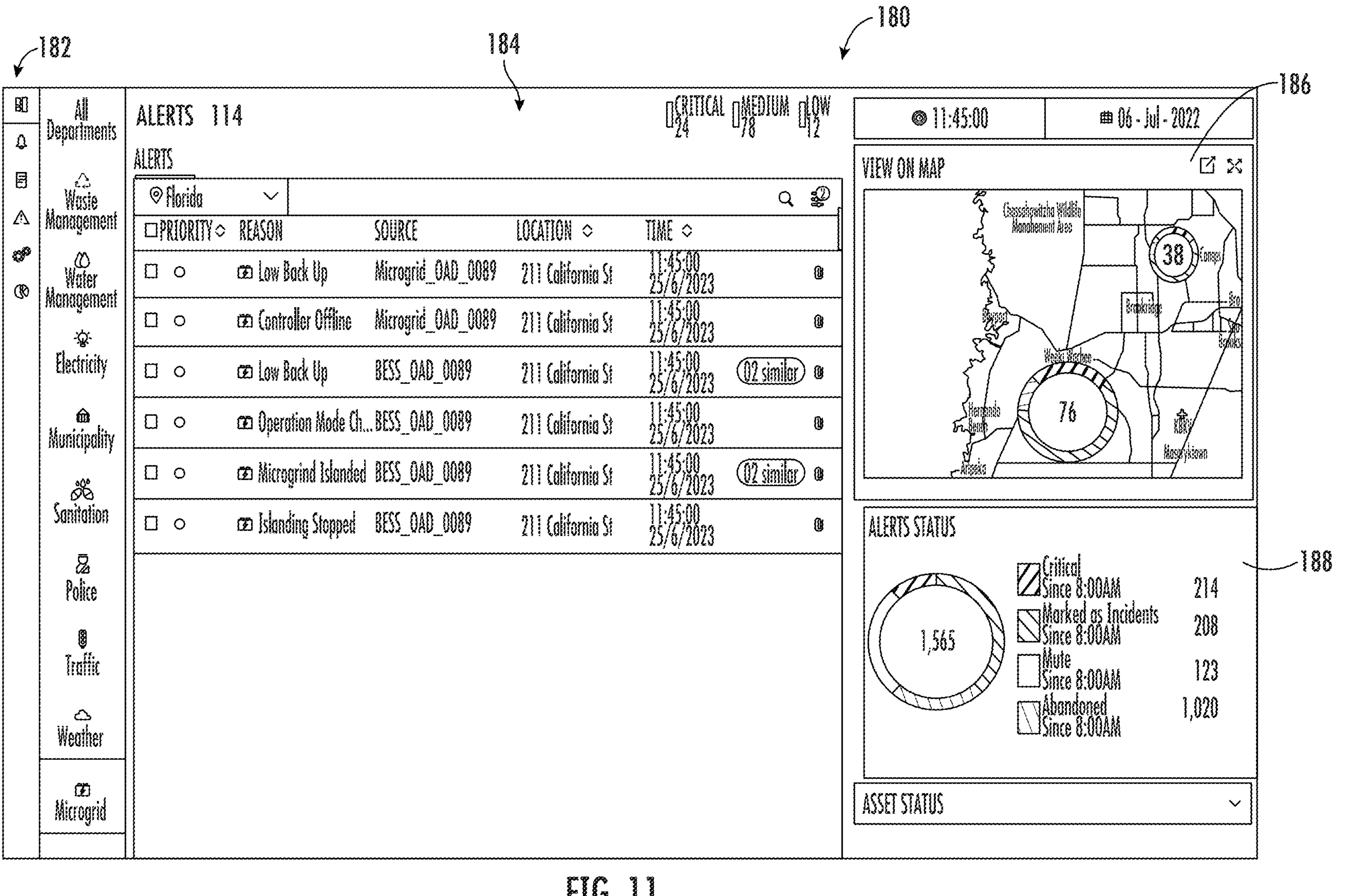
FIG. 11 is a screen shot showing an illustrative display that may be displayed by the city suite operator application of FIG. 2.

FIG. 11 shows an example alerts page 180 that may be reached by clicking on an Alerts icon in a vertical toolbar 182 displayed along the left side of the main dashboard 162 (FIG. 9). The displayed alerts pertain to resiliency parameters. The alerts page 180 includes an Alerts widget 184 that displays a variety of alerts. Examples of such include a Low Back Up alert, a Controller Offline alert, a Trip alert, an Operation Mode change alert, a Microgrid Islanded alert and an Islanding Stopped alert. In some instances, a variety of other alerts may also be displayed.

The Low Back Up alert may be displayed when the backup power is below a set threshold level. The Controller Offline alert may be displayed when the microgrid connection is offline or faulty. The Trip alert may be displayed when the microgrid is undergoing maintenance. Some of these alerts may be displayed when the microgrid stops taking power from the main grid and relies only on backup power, as well as when the main grid becomes available. The Alerts page includes a map widget 186 that displays the location of power outages that occurred over a period of time. An Alerts Status widget 188 displays a summary of all alerts, including abandoned alerts.

Figure 12:
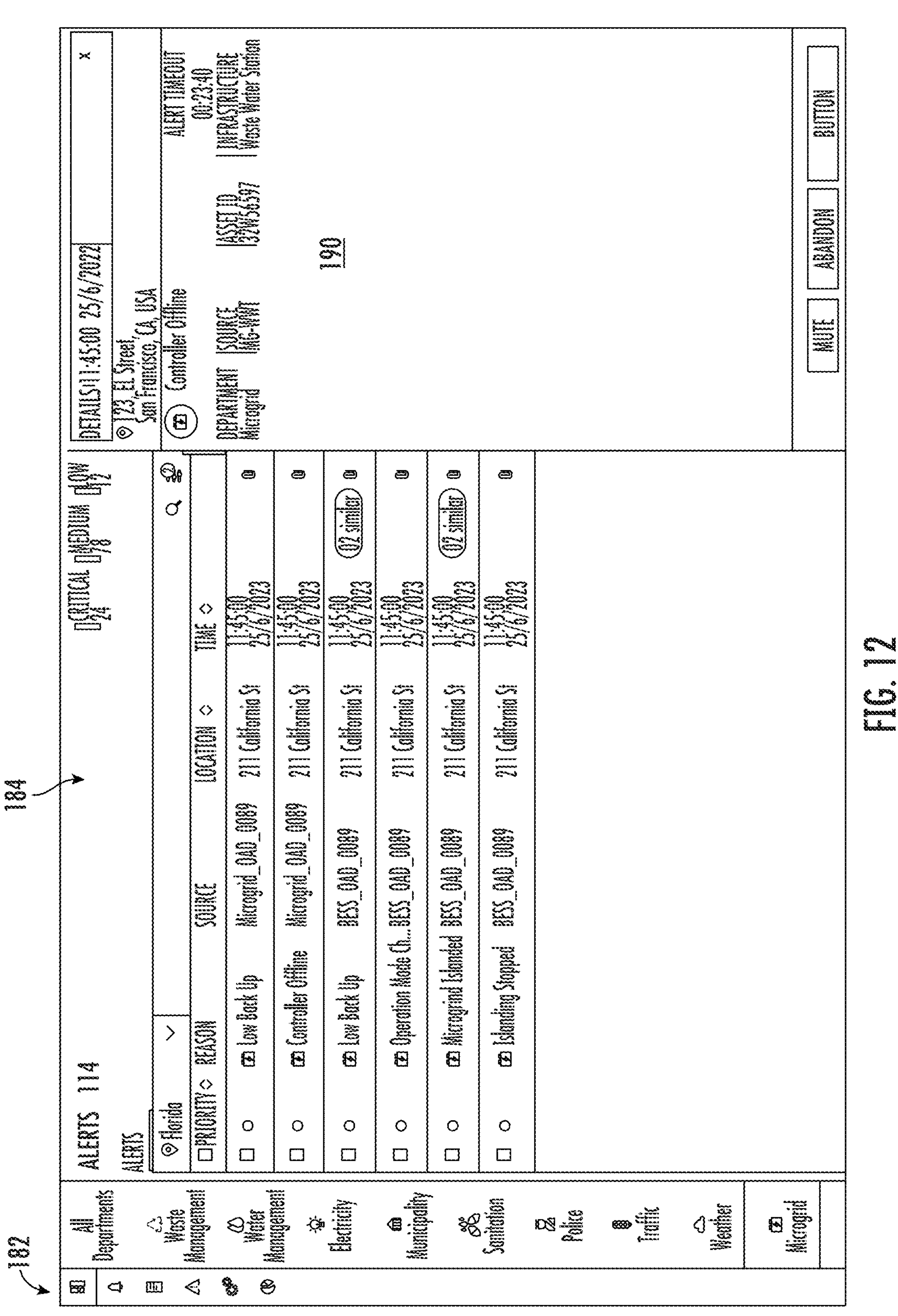
FIG. 12 is a screen shot showing an illustrative display that may be displayed by the city suite operator application of FIG. 2.

FIG. 12 shows an example individual alert panel 190 to the right that may be reached by clicking on one of the alerts shown in FIG. 11. The individual alert panel 190 may be superimposed over or otherwise take the place of the map view on the alerts page shown in FIG. 11. The individual alert panel 190 may include additional information regarding the selected alert, which in this case refers to a controller offline alert. The individual alert panel also includes a running time duration for the alert.

Figure 13:
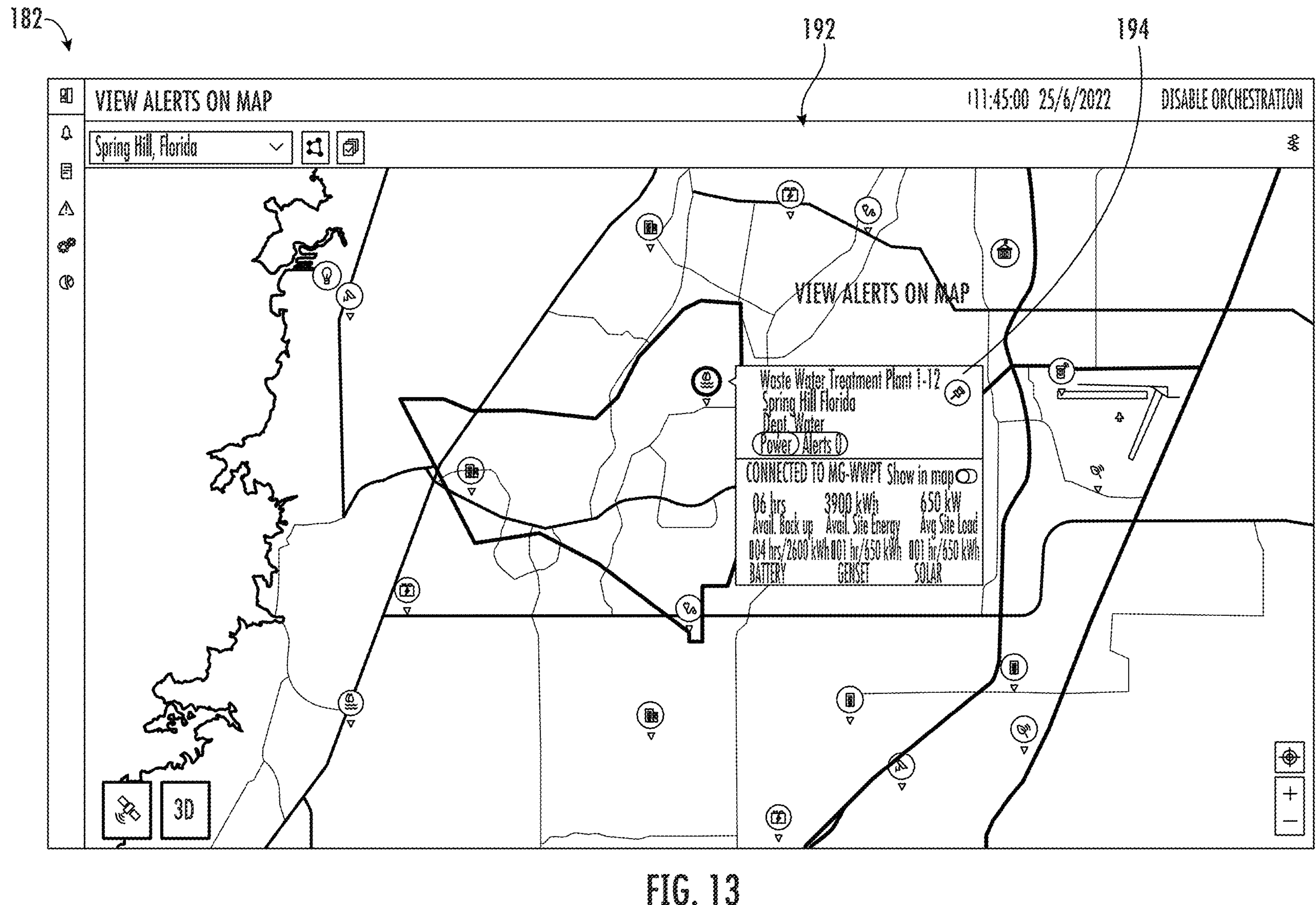
FIG. 13 is a screen shot showing an illustrative display that may be displayed by the city suite operator application of FIG. 2.

FIG. 13 shows an example map 192 that may be displayed. This shows the location of various facilities, each having differing icons such as a light bulb (representing a lighting system), a camera (representing a security system), a building (representing a building), a stethoscope (representing a medical facility), a power cord (representing power generation), a water icon (representing a water treatment facility), a leaf (representing a recycling facility) and others. An outline is displayed on the map 192 to indicate a particular area of the city. The user can select a predefined area of the city from a plurality of predefined areas of the city. A popup window 194 shows additional information for a selected facility in the selected area, which in this case is a waste water treatment plant.

Figure 14:
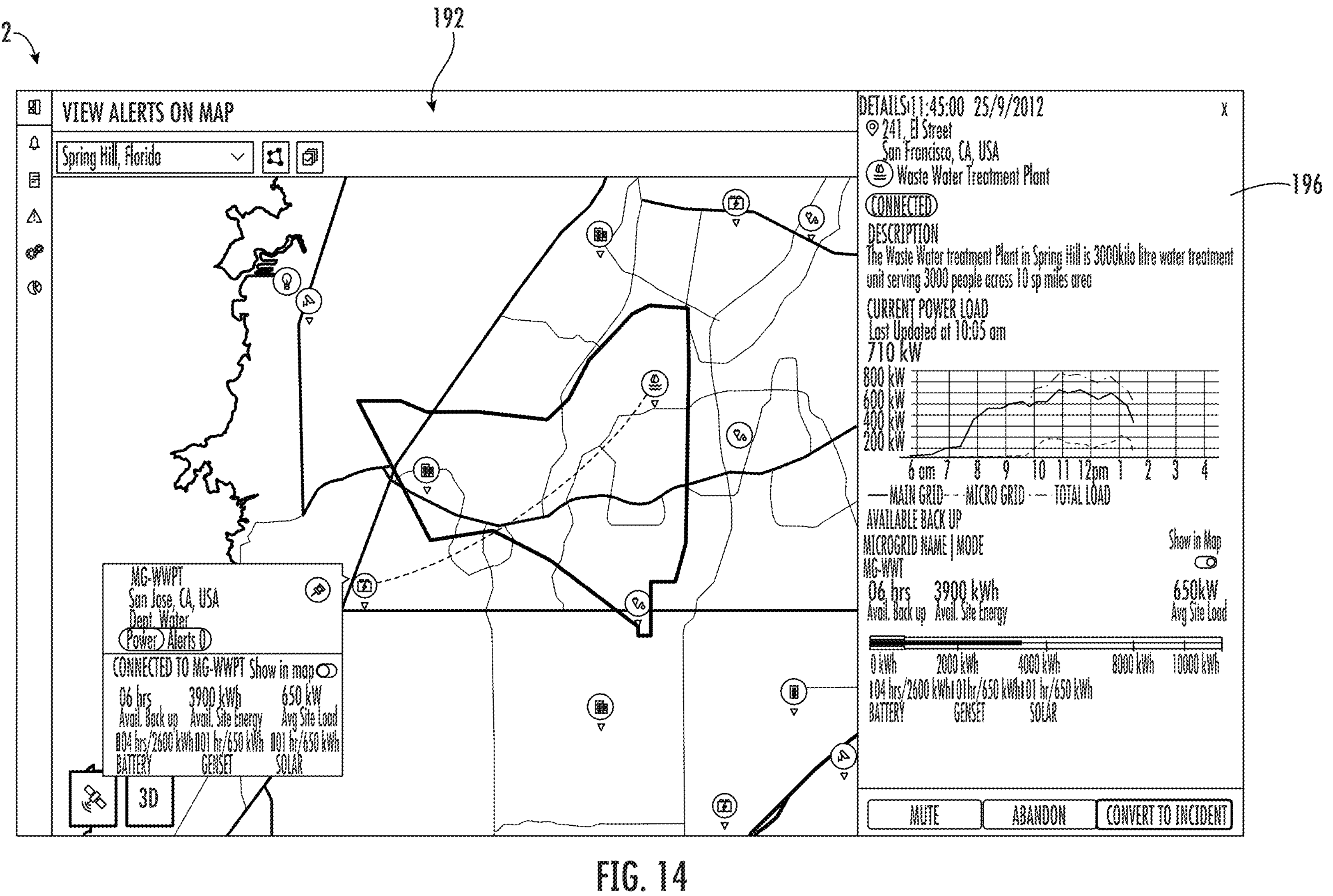
FIG. 14 is a screen shot showing an illustrative display that may be displayed by the city suite operator application of FIG. 2.
Figure 15:
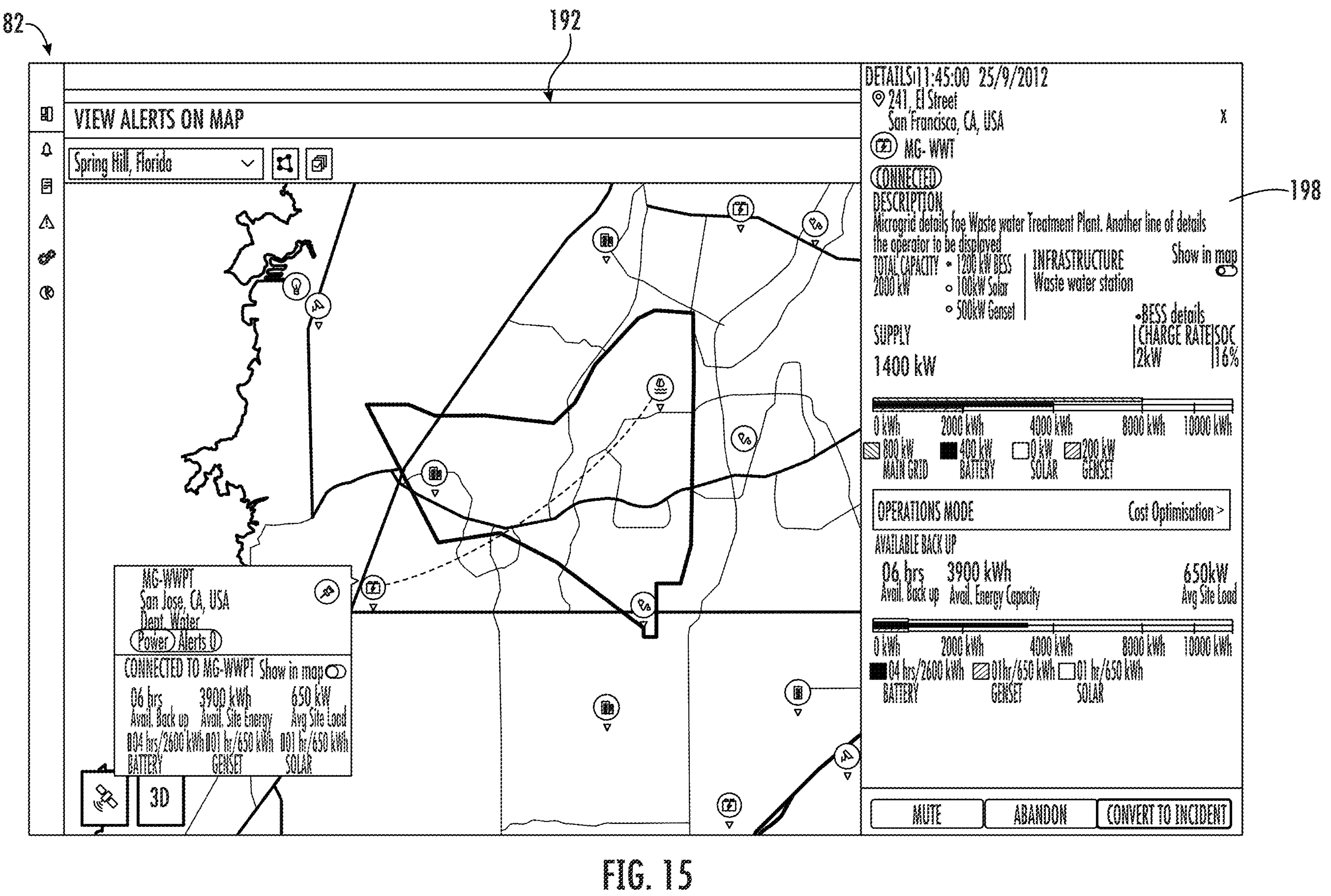
FIG. 15 is a screen shot showing an illustrative display that may be displayed by the city suite operator application of FIG. 2.

FIG. 14 shows an example infrastructure panel 196 placed to the right of the example map 192 of FIG. 13. This shows where the location of the microgrid (e.g. the microgrid controller and/or backup power supplies) that supplies power to the selected waste water treatment plant. A microgrid controller of the microgrid may be used to island the connected infrastructure from the Main Power when the Main Power goes offline, and manage the backup power to provide emergency backup power to the connected infrastructure. In some cases, the microgrid controller may receive backup power from various sources such as batteries, solar and/or wind, and may manage which of the backup power sources are used at any given time. For example, if the sun is out but there is only moderate wind, the microgrid controller may direct solar energy to the connected infrastructure, perhaps supplemented by energy from the wind and/or the batteries. In FIG. 14, the microgrid is represented by a battery icon, and a dashed line connects the microgrid to the waste water treatment plant as shown. A power cord icon near the bottom of the outline drawn on the map shows the location of the power generation plant that provides Main Power. The popup shown in FIG. 15 provides additional information including connection status (currently "Connected"), current power load (main, microgrid and combined) and available backup power. The user can toggle display of the infrastructure panel.

Figure 16:
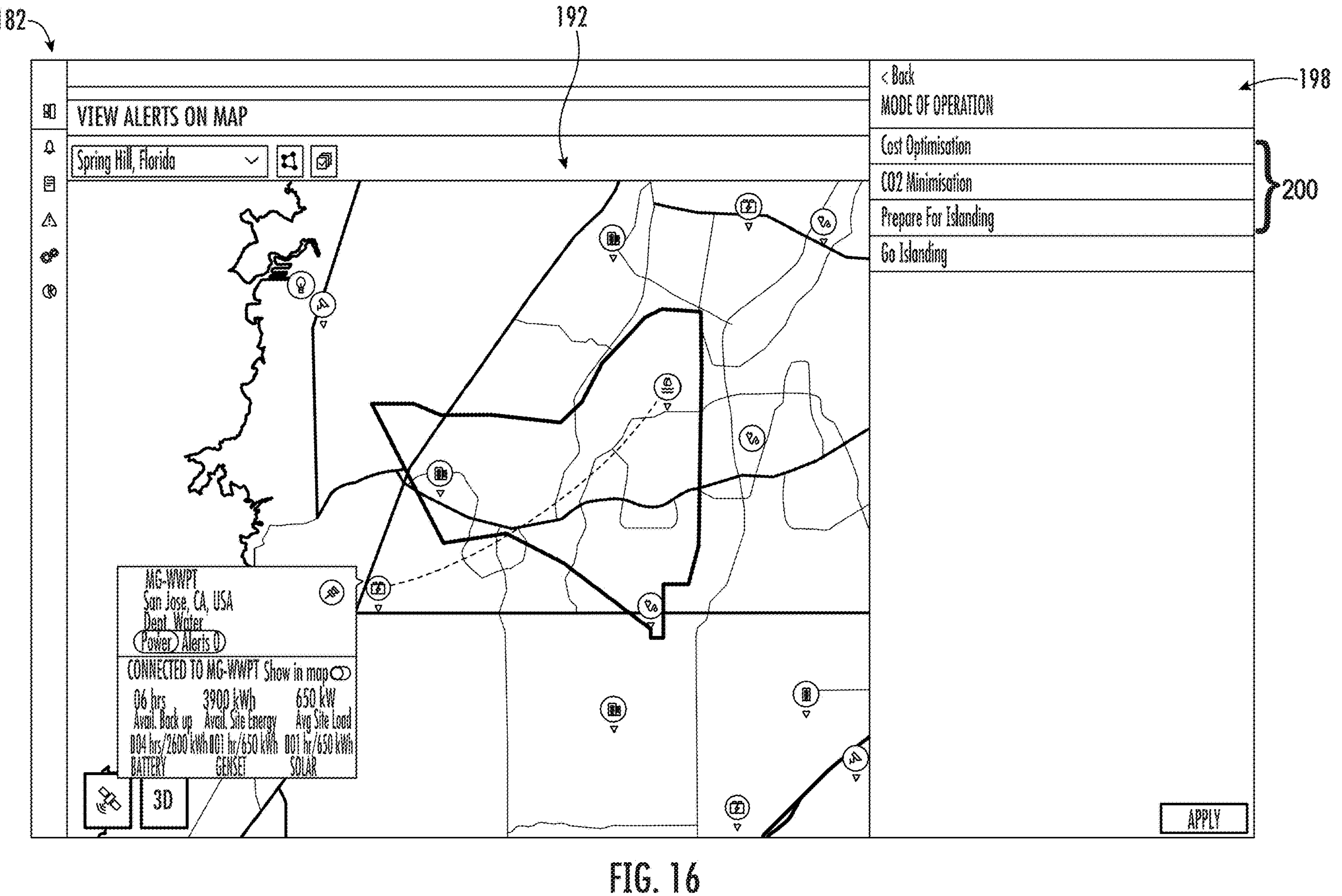
FIG. 16 is a screen shot showing an illustrative display that may be displayed by the city suite operator application of FIG. 2.

FIG. 15 shows an example microgrid panel 198 placed to the right of the example map of FIG. 14. This shows additional information regarding a selected microgrid, including power sources such as Main Power, battery, solar and local generation (e.g. diesel generator). The panel also includes information regarding available backup that could be brought online if necessary. The displayed information may be toggled between cost optimization, carbon dioxide minimization, go islanding, and prepare for islanding. These modes are illustrated in FIG. 16, which includes a listing 200 of the various modes.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for controlling a microgrid using a microgrid controller, wherein the microgrid has access to two or more energy sources and provides power to one or more microgrid loads, wherein the two or more energy sources include a main power grid source, a battery power source, a diesel generator power source and one or more of a solar power source and a wind power source, and wherein the microgrid controller is configured to control power delivery from each of the two or more energy sources to the one or more microgrid loads, the method comprising:

predicting when a loss of power from the main power grid source is predicted to occur in the future;

operating the microgrid controller in a prepare for islanding mode when the loss of power from the main power grid source is predicted to occur in the future, during which power received from the main power grid source, the solar power source and/or the wind power source are prioritized over energy costs and $CO_2$ emissions associated with the microgrid to charge the battery power source to at least a prepare for islanding charge level; and operating the microgrid controller in an islanding mode when a loss of power from the main power grid source occurs, during which power received from the solar power source, the wind power source, the battery power source and/or the diesel generator power source are prioritized to maximize a time that the microgrid can remain powered during the loss of power from the main power grid source.

2. The method of claim 1, wherein when receiving power from the main power grid source, and while not operating in the prepare for islanding mode or the islanding mode, operating the microgrid controller in a cost optimization mode during which power received from the solar power source, the wind power source, the battery power source and/or the diesel generator power source are prioritized over power received from the main power grid source during peak power demand periods of the one or more microgrid loads to reduce energy costs associated with the microgrid.

3. The method of claim 2, wherein when receiving power from the main power grid source, and while not operating in the prepare for islanding mode or the islanding mode, operating the microgrid controller in a $CO_2$ minimization mode when a $CO_2$ emissions threshold is exceeded or predicted to be exceeded for the microgrid during which power received from the solar power source, the wind power source and/or the battery power source are prioritized over power received from the main power grid source and/or power received from the diesel generator power source to reduce $CO_2$ emissions associated with the microgrid.

4. The method of claim 3, further comprising the microgrid controller:

receiving a total energy consumption metric for energy consumed by the microgrid; and while operating in the $CO_2$ minimization mode, when the total energy consumption metric exceeds a total energy consumption threshold, exiting the $CO_2$ minimization mode and entering the cost optimization mode.

5. The method of claim 1, wherein when receiving power from the main power grid source, and while not operating in the prepare for islanding mode or the islanding mode, operating the microgrid controller in a $CO_2$ minimization mode when a $CO_2$ emissions threshold is exceeded or predicted to be exceeded for the microgrid during which power received from the solar power source, the wind power source and/or the battery power source are prioritized over power received from the main power grid source and/or power received from the diesel generator power source to reduce $CO_2$ emissions associated with the microgrid.

6. The method of claim 1, further comprising the microgrid controller:

receiving a Time of Use (TOU) schedule from a utility providing the main power grid source; and ignoring the TOU schedule in the prepare for islanding mode until the battery power source is charged to at least the prepare for islanding charge level.

7. The method of claim 1, further comprising the microgrid controller:

receiving a fuel level for the diesel generator power source; and in the prepare for islanding mode, when the fuel level is below a prepare for islanding fuel level, sending a notification to request refueling of the diesel generator power source.

8. The method of claim 1, comprising:

predicting an outage duration for the predicted loss of power from the main power grid source;

predicting a power usage of the one or more microgrid loads during the outage duration; and predicting whether the one or more microgrid loads will remain powered during the predicted outage duration of the predicted loss of power from the main power grid source, and when it is predicted that the one or more microgrid loads will not remain powered during the predicted outage duration of the predicted loss of power from the main power grid source, sending a notification before the loss of power from the main power grid source is predicted to occur.

9. The method of claim 1, wherein after the battery power source is charged to at least the prepare for islanding charge level in the prepare for islanding mode, operating the microgrid controller in a cost optimization mode during which power received from the solar power source, the wind power source, the battery power source and/or the diesel generator power source are prioritized over power received from the main power grid source during peak power demand periods of the one or more microgrid loads to reduce energy costs associated with the microgrid.

10. The method of claim 9, comprising checking whether the battery power source has discharged below the prepare for islanding charge level by more than a threshold amount, and if so, returning to the prepare for islanding mode to charge the battery power source to at least the prepare for islanding charge level.

11. The method of claim 10, comprising checking whether the battery power source has discharged below the prepare for islanding charge level by more than a threshold amount, and if so, returning to the prepare for islanding mode to charge the battery power source to at least the prepare for islanding charge level.

12. The method of claim 1, wherein after the battery power source is charged to at least the prepare for islanding charge level in the prepare for islanding mode, operating the microgrid controller in a $CO_2$ minimization mode when a $CO_2$ emissions threshold is exceeded or predicted to be exceeded for the microgrid during which power received from the solar power source, the wind power source and/or the battery power source are prioritized over power received from the main power grid source and/or power received from the diesel generator power source to reduce $CO_2$ emissions associated with the microgrid.

13. A method for controlling a microgrid using a microgrid controller, wherein the microgrid has access to two or more energy sources and provides power to one or more microgrid loads, wherein the two or more energy sources include a main power grid source, a battery power source, a diesel generator power source and one or more of a solar power source and a wind power source, and wherein the microgrid controller is configured to control power delivery from each of the two or more energy sources to the one or more microgrid loads, the method comprising:

operating the microgrid controller in a cost optimization mode during which power received from the solar power source, the wind power source, the battery power source and/or the diesel generator power source are prioritized over power received from the main power grid source during peak power demand periods of the one or more microgrid loads to reduce energy costs associated with the microgrid; and operating the microgrid controller in a $CO_2$ minimization mode when a $CO_2$ emissions threshold is exceeded or predicted to be exceeded for the microgrid during which power received from the solar power source, the wind power source and/or the battery power source are prioritized over power received from the main power grid source and/or power received from the diesel generator power source to reduce $CO_2$ emissions associated with the microgrid.

14. The method of claim 13, further comprising the microgrid controller:

receiving a total energy consumption metric for energy consumed by the microgrid; and while operating in the $CO_2$ minimization mode, when the total energy consumption metric exceeds a total energy consumption threshold, exiting the $CO_2$ minimization mode and entering the cost optimization mode.

15. The method of claim 13, comprising:

predicting an outage duration for the predicted loss of power from the main power grid source;

predicting a power usage of the one or more microgrid loads during the outage duration; and predicting whether the one or more microgrid loads will remain powered during the predicted outage duration of the predicted loss of power from the main power grid source, and when it is predicted that the one or more microgrid loads will not remain powered during the predicted outage duration of the predicted loss of power from the main power grid source, sending a notification before the loss of power from the main power grid source is predicted to occur.

16. The method of claim 13, comprising:

predicting when a loss of power from the main power grid source is predicted to occur in the future; and operating the microgrid controller in a prepare for islanding mode when the loss of power from the main power grid source is predicted to occur in the future, during which power received from the main power grid source, the solar power source and/or the wind power source are prioritized over energy costs and $CO_2$ emissions associated with the microgrid to charge the battery power source to at least a prepare for islanding charge level.

17. The method of claim 16, further comprising the microgrid controller:

receiving a Time of Use (TOU) schedule from a utility providing the main power grid source; and ignoring the TOU schedule in the prepare for islanding mode until the battery power source is charged to at least the prepare for islanding charge level.

18. The method of claim 16, further comprising the microgrid controller:

receiving a fuel level for the diesel generator power source; and in the prepare for islanding mode, when the fuel level is below a prepare for islanding fuel level, sending a notification to request refueling of the diesel generator power source.

19. A microgrid controller for controlling a microgrid, wherein the microgrid has access to two or more energy sources and provides power to one or more microgrid loads, wherein the two or more energy sources include a main power grid source, a battery power source, a diesel generator power source and one or more of a solar power source and a wind power source, the microgrid controller comprising:

one or more switching elements for controlling power delivery from each of the two or more energy sources to the one or more microgrid loads;

a controller operatively coupled to the one or more switching elements, the controller configured to:

operate in a cost optimization mode during which power received from the solar power source, the wind power source, the battery power source and/or the diesel generator power source are prioritized over power received from the main power grid source during peak power demand periods of the one or more microgrid loads to reduce energy costs associated with the microgrid;

operate in a prepare for islanding mode when a loss of power from the main power grid source is predicted to occur in the future, during which power received from the main power grid source, the solar power source and/or the wind power source are prioritized over energy costs and $CO_2$ emissions associated with the microgrid to charge the battery power source to at least a prepare for islanding charge level; and operate in an islanding mode when a loss of power from the main power grid source occurs, during which power received from the solar power source, the wind power source, the battery power source and/or the diesel generator power source are prioritized to maximize a time that the microgrid can remain powered during the loss of power from the main power grid source.

20. The microgrid controller of claim 19, wherein the controller is configured to:

operate in a $CO_2$ minimization mode when a $CO_2$ emissions threshold is exceeded or predicted to be exceeded for the microgrid during which power received from the solar power source, the wind power source and/or the battery power source are prioritized over power received from the main power grid source and/or power received from the diesel generator power source to reduce $CO_2$ emissions associated with the microgrid.

* * * * *